United States Patent
Shamia et al.

(10) Patent No.: US 7,844,688 B2
(45) Date of Patent: Nov. 30, 2010

(54) APPARATUS, METHOD, AND SOFTWARE FOR ANALYZING NETWORK TRAFFIC IN A SERVICE AWARE NETWORK

(75) Inventors: Doron Shamia, Modiin (IL); Yuval Shachar, Hertzlia (IL); Oren Ravoy, San Francisco, CA (US)

(73) Assignee: P-Cube Ltd., Herzlia (IL)

( * ) Notice: Subject to any disclaimer, the term of this patent is extended or adjusted under 35 U.S.C. 154(b) by 945 days.

(21) Appl. No.: 11/322,364

(22) Filed: Jan. 3, 2006

(65) Prior Publication Data
US 2006/0195556 A1   Aug. 31, 2006

Related U.S. Application Data

(63) Continuation-in-part of application No. 09/988,831, filed on Nov. 20, 2001.

(51) Int. Cl.
*G06F 15/177* (2006.01)
(52) U.S. Cl. .................. 709/220; 709/224; 370/252; 717/114
(58) Field of Classification Search ............... 709/220, 709/224, 221, 227–229; 370/241, 252, 253, 370/235, 401, 231–234; 717/114–119
See application file for complete search history.

(56) References Cited

U.S. PATENT DOCUMENTS

| | | | |
|---|---|---|---|
| 5,640,319 A | 6/1997 | Beuning et al. | |
| 5,682,542 A | 10/1997 | Enomoto et al. | |
| 5,734,831 A | 3/1998 | Sanders | |
| 5,774,729 A | 6/1998 | Carney et al. | |
| 5,835,726 A | 11/1998 | Shwed et al. | |
| 5,850,388 A * | 12/1998 | Anderson et al. | 370/252 |
| 5,920,566 A * | 7/1999 | Hendel et al. | 370/401 |
| 6,014,138 A | 1/2000 | Cain et al. | |
| 6,629,141 B2 | 9/2003 | Elzur et al. | |
| 6,751,663 B1 | 6/2004 | Farrell et al. | |
| 6,757,727 B1 | 6/2004 | Ivory | |
| 6,779,120 B1 * | 8/2004 | Valente et al. | 726/1 |
| 6,782,422 B1 * | 8/2004 | Bahl et al. | 709/224 |
| 6,854,117 B1 | 2/2005 | Roberts | |
| 6,928,482 B1 | 8/2005 | Ben-Nun et al. | |
| 6,940,814 B1 * | 9/2005 | Hoffman | 370/235 |
| 7,310,670 B1 * | 12/2007 | Walbeck et al. | 709/225 |
| 2002/0016856 A1 | 2/2002 | Tallegas et al. | |
| 2002/0165727 A1 | 11/2002 | Greene et al. | |
| 2004/0071135 A1 | 4/2004 | Jimmei et al. | |

* cited by examiner

*Primary Examiner*—Wing F Chan
*Assistant Examiner*—Ruolei Zong
(74) *Attorney, Agent, or Firm*—Abelman, Frayne & Schwab

(57) ABSTRACT

The present invention generally relates to a method for describing network events in a service aware network ("SAN"). In addition, the present invention relates to software that performs the method and has a programming model containing protocol libraries, abstract protocol messages declarations, and network events. The method and software enable a user to define basic as well as complex network events in the application, presentation, session, transport and/or network layers of a communication model, which result in internet protocol ("IP") level triggers or other triggers. Such triggers will result in actions which may be applicable in all layers of a communication model up to the highest layer. As a result, the method and software allow a user to describe a hierarchy of high level network events through a hierarchy of lower level events. In addition, a development system and an apparatus which utilizes the method and software are also provided.

4 Claims, 18 Drawing Sheets

| Layer 7 | Application layer |
|---|---|
| Layer 6 | Presentation layer |
| Layer 5 | Session layer |
| Layer 4 | Transport Communication Protocol ("TCP") layer |
| Layer 3 | Internet Protocol ("IP") layer |
| Layer 2 | Logical layer |
| Layer 1 | Physical layer |

Fig. 5

```
700     event FTP_User_Connected ( )
701     {
702             match[var=FTP_Cmd](USER)
703             {
704                     concurrent
705                     {
706                             match[var=FTP_Resp](Code=230)
707                             {
708                                     success( );
709                             }
710                             match[var=FTP_Resp](Code=331)
711                             {
712                                     match[var=FTP_Cmd](PASS)
713                                     {
714                                             concurrent
715                                             {
716                                                     match[var=FTP_Resp](Code=230)
717                                                     {
718                                                             success( );
719                                                     }
720                                                     match[var=FTP_Resp](Code=530)
721                                                     {
722                                                             fail( );
723                                                     }
724                                             }
725                                     }
726                             }
727                             match[var=FTP_Resp](Code=530)
728                             {
729                                     fail( );
730                             }
731                     }
732             }
733     }
```

Fig. 7

```
900     event FTP_User_Connected ( )
901     {
902             match[var=FTP_Cmd](USER)
903             {
904                     concurrent
905                     {
906                             match[var=FTP_Resp](Code=230)
907                             {
908                                     success( );
909                             }
910                             match[var=FTP_Resp](Code=530)
911                             {
912                                     fail( );
913                             }
914                     }
915             }
916     }
```

Fig. 9

```
1100    event QoSValue1( )
1101    {
1102            match[var=IPHeader, at=ip, immediate=off](TOS=HIGH)
1103            {
1104                    success( );
1105            }
1106    }
```

Fig. 11

```
1200    event QoSValue2( )
1201    {
1202            match[var=IPHeader, at=ip, immediate=on](TOS=HIGH)
1203            {
1204                    success( );
1205            }
1206            otherwise
1207            {
1208                    fail( );
1209            }
1210    }
```

Fig. 12

```
1300    event UrgentSegment( )
1301    {
1302            match[var=TCPHeader, at=transport, immediate=off](DPORT=21)
1303            {
1304                    success( );
1305            }
1306    }
```

Fig. 13

```
1400    anADTType ::= SEQUENCE
1401    {
1402            integer f1
1403            integer f2
1404    }
1405
1406    event A1( )
1407    {
1408            match [event = A2( )](A2.anAlias = 2)
1409            {
1410                    specific operation
1411            }
1412    }
1413
1414    event A2( )
1415    {
1416            anADTType aLocalVar;
1417            alias anAlias = aLocalVar.f1
1418            match [var=aLocalVar]( )
1419            {
1420                    specific operation
1421            }
1422    }
```

Fig. 14

```
1500    SANTimer_t myTimer;
1501
1502    myTimer.set(value=10, direction=down, resolution=mili, bound=0);
1503
1504    myTimer.start( );
1505
1506    match [. . .](. . .)
1507    {
1508            specific operation
1509    }
1510
1511    myTimer.timout( )
1512    {
1513            specific operation
1514    }
```

Fig. 15

```
1600    SANMeter_t myMeter;
1601
1602    myMeter.set(metric=bytes, flowUN=-1, bound=1000);
1603
1604    myMeter.start( );
1605
1606    match [dir=>](. . .)
1607    {
1608            specific operation
1609    }
1610
1611    myMeter.pause( );
1612
1613    if myMeter.value >100
1614    {
1615            specific operation
1616    }
1617
1618    myMeter.resume( )
```

Fig. 16

```
1700  event QoSHigh( )
1701  {
1702          match[var=IPHeader, at=ip](TOS=QOS_HIGH);
1703          {
1704                  success( );
1705          }
1706
1707  event HighJitter( )
1708  {
1709          SANTimer_t jitterTimer;
1710          jitterTimer.set(value=0, direction=..., resolution=mili, bound=...);
1711          int32 transit, tmp, delta, jitter;
1712          const int32 JITTER_THRESHOLD = 17;
1713          transit, jitter = 0;
1714          jitterTimer.start( );
1715          while (true)
1716          {
1717                  match[var=RTPHeader]( )
1718                  {
1719                          tmp = jitterTimer.value - RTPHeader.timeStamp;
1720                          delta = transit-tmp;
1721                          transit = tmp;
1722                          if (delta < 0)
1723                          {
1724                                  delta = (-1) * delta;
1725                          }
1726                          jitter = delta - ((jitter + 8) >> 4);
1727                          if (jitter > JITTER_THRESHOLD)
1728                          {
1729                                  success( );
1730                          }
1731                  }
1732          }
1733  }
1734
1735  event IncreaseBandwidth( )
1736  {
1737          match[event=HighJitter( )]( )
1738          {
1739                  match[event=QoSHigh( )]( )
1740                  {
1741                          success( );
1742                  }
1743          }
1744  }
```

Fig. 17

```
1800    concurrent
1801    {
1802            match[flow=0]
1803            {
1804                    .match[var=FTPflow]
1805                    {
1806                            mergeFlow(1);
1807                    }
1808            }
1809
1810            match[flow=1]
1811            {
1812                    . . .
1813                    . . .
1814            }
1815    }
```

Fig. 18

```
1900    event  event A( )
1901    {
1902           resync on anException;
1903           {
1904                  match[var = UserCMD]( )
1905                  {
1906                         match[var=PassWord]( )
1907                         {
1908                                ...
1910                         }
1911                         otherwise
1912                         {
1913                                ...
1914                                throw anException;
1915                         }
1916                  }
1917           }
1918    }
```

Fig. 19

APPARATUS, METHOD, AND SOFTWARE FOR ANALYZING NETWORK TRAFFIC IN A SERVICE AWARE NETWORK

CROSS-REFERENCE TO RELATED APPLICATIONS

This application is a continuation-in-part of prior co-pending U.S. patent application Ser. No. 09/988,831, filed Nov. 20, 2001, the disclosure of which is incorporated by reference.

FIELD OF THE INVENTION

The present invention generally relates to service aware networks ("SANs"). More specifically, the present invention relates to software that detects and monitors events and sequences of events in a structured and hierarchical manner to enable SAN systems to be easily programmed. In one implementation, the software is capable of translating application layer level events into Internet Protocol ("IP") packet level triggers. The present invention also relates to a method performed by the software and a system that executes the software.

BACKGROUND OF THE INVENTION

In a digital communication network (e.g. a service area network ("SAN")), data packets are transmitted over the network between a source computer (e.g. a personal computer, router, server, etc.) and a destination computer (e.g. a personal computer, router, server, etc.). Also, the transmission of data packets from the source computer to the destination computer is typically referred to as a "downstream" transmission of the data packets, and the transmission of data from the destination computer to the source computer is generally referred to as an "upstream" transmission.

When data packets are transmitted from the source computer to the destination computer (or from the destination computer to the source computer), the data packets typically pass through one or more nodes of the network. Often, a node contains hardware and/or software that analyzes the data packets that have been output from the source computer (or destination computer) and determines a path or channel on which the data packets are output so that they are routed towards the destination computer (or source computer).

In general, each data packet contains a data packet header, and the node analyzes the data contained in the header to determine how to appropriately route the data packet towards the destination computer (or source computer). FIG. 1 illustrates a typical data packet header HDR, which comprises a source Internet protocol ("IP") address field 100, a destination IP address field 110, a protocol field 120, a source port field 130, and a destination port field 140. The source IP address field 100 contains an IP address that identifies the source computer transmitting the data packet. The destination IP address field 110 contains a destination address that identifies the intended destination computer of the data packet. The protocol field 120 contains protocol data that identifies the data format and/or the transmission format of the data contained in the data packet. The source port field 130 includes data that identifies the computer port that physically outputs the data packet, and the destination port field 140 contains data that represents the computer port that is supposed to input the data packet. By analyzing the data in one or more of the fields 100, 110, 120, 130, and 140 of the header HDR, the node is able to appropriately route the data packet via the appropriate data path or channel.

Each data packet that is transmitted between the source and destination computers (and possibly additional computers) on the network constitutes at least a portion of a particular command or data string. For example, when the source computer sends a command or data string to the destination computer, the command or data string is typically segmented into several data packets, and each of the data packets are separately transmitted over the network. Then, the data packets are reassembled to form the command or data string at the destination computer (or at an intermediate node), and the destination computer (or intermediate node) processes the command or data string.

In addition, each command or data string transmitted between the source and destination computers may constitute at least part of a higher level event that is performed by a specific application. For example, one or more commands may be transmitted from the source computer to the destination computer (or an intermediate node) to indicate that a user at the source computer has lifted a telephone handset connected to the source computer. The lifting of the handset may be an action performed by the user to initiate a video conference call between the source and destination computers (and or other nodes) of the network. In such a scenario, the video conference call may constitute a high level event or application, and the lifting of the handset generates one or more commands that are part of such event. Also, the lifting of the handset itself may constitute a lower level event or application.

In another example, an event may be logging into a server by a user of the source computer. To perform such an event, the user would input a login request to the source computer, and the computer would send one or more commands, which correspond to the login request, to the server. Then, in response to the login request, the server may send one or more responses to the source computer to instruct the source computer to prompt the user to input a username and a corresponding password. Afterwards, the source computer prompts the user to input such information, and when the user inputs a username and password, the source computer generates one or more data strings containing the input information and forwards the one or more data strings to the server. When the server receives the username and password, the server determines if such information is correct. If the username and password are correct, the server generates one or more responses informing the source computer that the login has been successful.

In the above example, the login event is performed by exchanging various commands and data strings between the source computer and the server. Also, each of the commands and data strings is formed by one or more data packets that are transmitted between the source computer and the server.

One of the main functions of SANs is to handle basic events, such as the events described above, as well as handling more complex applications and events. Furthermore, in order to ensure that the various applications transmitted on network are executed at high speeds and have high quality, the SANs must dynamically respond to the specific needs of the various applications as they enter and exit the network and various systems within the network. For example, when a video conference is being performed via the network, the network must ensure that real-time video is transmitted over the network so that the end users participating in the conference call view each other with high quality motion video. Moreover, the SAN must ensure that the audio data transmitted over the network is fully synchronized with the video image transmitted over the network. If the audio data is not synchronized with the video image, the end users would see someone speaking but would not hear the spoken words and, at a different instance, would here the spoken words but would not see anyone speaking.

Accordingly, when the SAN recognizes that a video conference event is occurring, the SAN should activate various hardware and/or software devices within various nodes of the SAN. When the various devices are activated, they attempt to ensure that real-time video is transmitted during the video conference, that the video image and audio data are synchronized during the video conference, and that other operations are performed during the video conference. Similarly, when the SAN recognizes that other events occur on the network, the SAN should activate the necessary hardware and/or software to ensure that such events are performed with the highest possible quality.

Moreover, the SAN should ideally monitor the activity on the network and predict when the video conference call or other events will occur as soon as possible so that the SAN can quickly activate the necessary hardware and/or software device. By quickly activating and allocating the various resources needed to perform the event, all of the resources and other components for executing the event will be completely available and ready to perform the event when the event begins or immediately after the event occurs. As a result, the event can be performed at the highest possible quality.

However, most SANs analyze the activity and traffic on the network based on the data packets transmitted across the network. Since the data packets typically form only a part of a command or data string and since the command or data string typically form only part of an event, predicting the higher level event to which the data packets belong is extremely difficult. Thus, the SAN often cannot determine that a particular event is going to occur until immediately before the event occurs. In some cases, the SAN cannot determine that the event is going to occur until after the event is occurring. Thus, in conventional SANs, the quality of many events and applications that are transmitted over the networks is relatively low.

As described above, the monitoring devices in conventional SANs analyze the traffic transmitted on the network by analyzing individual data packets. Thus, such monitoring devices typically have been programmed to activate various hardware and/or software devices to perform some simplistic and discrete network functions based on the contents of the data packets. However, such "packet level programming" is extremely complex and difficult. For example, a packet level program that controls the operation of the monitoring devices is not scalable, cannot be easily designed in a robust manner, and is difficult to debug and maintain.

In particular, if programming SAN monitoring devices in the networking environment is compared with convention programming in a non-network environment, programming the monitoring devices at the packet level (up to the third layer of the communication model) is analogous to programming a non-network computer in machine language. Thus, programming the monitoring devices (and other devices) in a SAN is extremely difficult because higher level programming methods and tools, which are analogous to the programming languages of C and C++, do not exist to describe the various events transmitted over and processed by the SAN. As a result, a programmer can only program the various devices within the SAN by analyzing the individual low level data packets instead of by analyzing the higher level events that are accomplished by transmitting many data packets. In other words, the programmer can only program the SAN devices via a "bottom up" programming approach. Consequently, if the types of data packets exchanged among various computers on the network during a particular event change or if the order in which data packets are exchanged change, the majority of the packet level programming that controls the various devices involved in performing the event must be rewritten. Since several different nodes within the network typically process many types of data packets to perform a single event, when one of the nodes in the SAN needs to be reprogrammed, many other nodes in the network must also be reprogrammed. Due to the large amount of effort required to reprogram many nodes, the conventional monitoring devices within SANs cannot practically be programmed to monitor high level and complex events.

Many examples of conventional programming languages exist that perform certain types of network monitoring and management operations. Such programming languages allow the creation of specific applications based on a plurality of rules and constraints. One example of such languages has been invented by Shwed et al. and is disclosed in U.S. Pat. No. 5,835,726 ("the '726 patent"), which is incorporated herein by reference for all purposes. The language described in the '726 patent was designed to improve the security of networks but only teaches a packet-by-packet analysis of the process flow. Thus, the '726 patent does not address analyzing a flow of data packets within a process flow at the data packet level and does not address analyzing and processing multiple process flows and higher events defined in the process flows.

In addition, other monitoring and processing devices within SANs are specifically programmed to efficiently route the data packets corresponding to a specific application. However, presently and especially in the near future, SANs will require more sophisticated ways to handle, manage, and transport packets over the network. For example, they will require the ability to manage not only a specific application but also to manage the interaction between applications as the applications are transported throughout the network. This type of management requires new types of programming methods, tools, and scripting languages that enable SAN devices perform complex operations beyond efficiently routing the data packets of a specific application.

As described above, the conventional programming techniques enable a programmer to program a SAN device to analyze the traffic on the SAN. However, such techniques require a "bottom up" programming approach in which the programmer must specify packet-by-packet rules and constraints. Such programming techniques ultimately develop programs and scripts that are not scalable since most network protocols utilize technologies that enable them to ignore the actual packetization of the data transmitted on the network. Thus, for the reasons presented above, creating a program that applies packet-by-packet decisions to application level logic based on the conventional programming techniques is unfeasible.

Accordingly, a substantial need exists for a programming method or tool that enables high level events to be defined hierarchically such that complex, high level events can be defined based on simpler, lower level events. In addition, the programming method or tool should allow the programmer to fully define the parallel processing that may occur within the definition of events and define the network protocol and specific messages (including their structure and transfer mechanisms) that are used in executing events. Also, the programming method or tool should enable the monitoring device (or other device) to search for the network protocol and specific messages in a stream of data packets that constitute a network process flow. Moreover, the programming method or tool should enable the programmer to program the monitoring device (or other device) without requiring the programmer to analyze individual packets to create a program that makes packet-by-packet decisions. In other words, the programming device or tool should enable the programmer to program the SAN devices via a "top down" programming approach.

If a higher level programming language was available to program SAN devices to monitor or manage data on an event-by-event basis, robust and scalable programs could be developed relatively easily. In addition, if the types of data packets exchanged among various computers on the network during a particular event change or if the order in which data packets are exchanged change, the programs would not have to be substantially modified. Specifically, if the programs are written at the "event" level instead of the "data packet" level, only the compiler that compiles the programming language would need to be changed so that the data packets are processed in the correct manner.

SUMMARY OF THE INVENTION

In an illustrative example, a method for controlling a network system is provided which comprises: (a) defining a first event that occurs in said network system, wherein said event is defined via software; and (b) controlling at least a portion of said network system based on said first event.

In another illustrative example, a method for controlling a network system is provided which comprises: (a) defining a matching operation that occurs in said network system, wherein said matching operation is defined via software and detects an occurrence corresponding to information transmitted over said network system, and wherein said occurrence is identified in said matching operation; and (b) controlling at least a portion of said network system based on said matching operation.

In yet another illustrative example, a method for controlling a network system is provided which comprises: (a) defining a concurrent operation, wherein said concurrent operation comprises a first group of operations comprising at least a first operation and a second operation that are concurrently performed; and (b) controlling at least a portion of said network system based on said concurrent operation.

In a further illustrative example, a method for controlling a network system is provided which comprises: (a) defining a first throw operation, wherein said first throw operation identifies resynchronization operation corresponding to said first throw operation, and wherein said first throw operation causes a specific operation corresponding to said resynchronization operation to be performed; and (b) controlling at least a portion of said network system based on said first throw operation and said resynchronization operation.

In a still further illustrative example, an apparatus for controlling a network system is provided which comprises: an interface coupled to a network of said network system; and a processor that processes a first event that occurs in said network system, wherein said first event is defined via software and wherein said processor controls at least a portion of said network system when said first event is processed.

In an even further illustrative example, an apparatus for controlling a network system is provided which comprises: an interface coupled to a network of said network system; and a processor that processes a matching operation that occurs in said network system, wherein said matching operation is defined via software and instructs said processor to detect an occurrence corresponding to information transmitted over said network system, wherein said occurrence is identified in said matching operation, and wherein said processor controls at least a portion of said network system based on said matching operation.

In an additional illustrative example, an apparatus for controlling a network system is provided which comprises: an interface coupled to a network of said network system; and a processor that processes a concurrent operation, wherein said concurrent operation comprises a first group of operations comprising at least a first operation and a second operation that are concurrently processed by said processor, and wherein said processor controls at least a portion of said network system based on said concurrent operation.

In yet another illustrative example, an apparatus for controlling a network system is provided which comprises: an interface coupled to a network of said network system; and a processor that performs a first throw operation, wherein said first throw operation identifies resynchronization operation corresponding to said first throw operation, wherein said first throw operation causes said processor to perform a specific operation corresponding to said resynchronization operation, and wherein said processor controls at least a portion of said network system based on said first throw operation and said resynchronization operation.

In an additional illustrative example, a software program contained in a computer readable medium containing instructions for causing a processor to perform a routine is provided which comprises: (a) defining a first event that occurs in said network system, wherein said event is defined via software; and (b) controlling at least a portion of said network system based on said first event.

In still an additional illustrative example, a software program contained in a computer readable medium containing instructions for causing a processor to perform a routine is provided which comprises: (a) defining a matching operation that occurs in said network system, wherein said matching operation is defined via software and detects an occurrence corresponding to information transmitted over said network system, and wherein said occurrence is identified in said matching operation; and (b) controlling at least a portion of said network system based on said matching operation.

In an even further illustrative example, a software program contained in a computer readable medium containing instructions for causing a processor to perform a routine is provided which comprises: (a) defining a concurrent operation, wherein said concurrent operation comprises a first group of operations comprising at least a first operation and a second operation that are concurrently performed; and (b) controlling at least a portion of said network system based on said concurrent operation.

In another illustrative example, a software program contained in a computer readable medium containing instructions for causing a processor to perform a routine is provided which comprises: (a) defining a first throw operation, wherein said first throw operation identifies resynchronization operation corresponding to said first throw operation, and wherein said first throw operation causes a specific operation corresponding to said resynchronization operation to be performed, (b) controlling at least a portion of said network system based on said first throw operation and said resynchronization operation.

In still another illustrative example, a development system for creating an application program is provided which comprises: a computer readable medium containing a software program having instructions; and a compiler that compiles said instructions into network triggers for a network processor, wherein said software program contains instructions to perform a routine, comprising: (a) defining a first event that occurs in said network system, wherein said event is defined via software; and (b) controlling at least a portion of said network system based on said first event.

In an even further illustrative example, a development system for creating an application program is provided which comprises: a computer readable medium containing software having instructions; and a compiler that compiles said instructions into network triggers for a network processor, wherein said software program contains instructions to perform a routine, comprising: (a) defining a matching operation that occurs in said network system, wherein said matching operation is defined via software and detects an occurrence corresponding to information transmitted over said network system, and wherein said occurrence is identified in said matching operation; and (b) controlling at least a portion of said network system based on said matching operation.

In an additional illustrative example, a development system for creating an application program is provided which comprises: a computer readable medium containing software having instructions; and a compiler that compiles said instructions into network triggers for a network processor, wherein said software program contains instructions to perform a routine, comprising: (a) defining a concurrent operation, wherein said concurrent operation comprises a first group of operations comprising at least a first operation and a second operation that are concurrently performed; and (b) controlling at least a portion of said network system based on said concurrent operation.

In a further illustrative example, a development system for creating an application program is provided which comprises: a computer readable medium containing software having instructions; and a compiler that compiles said instructions into network triggers for a network processor, wherein said software program contains instructions to perform a routine, comprising: (a) defining a first throw operation, wherein said first throw operation identifies resynchronization operation corresponding to said first throw operation, and wherein said first throw operation causes a specific operation corresponding to said resynchronization operation to be performed, (b) controlling at least a portion of said network system based on said first throw operation and said resynchronization operation.

BRIEF DESCRIPTION OF THE DRAWINGS

The above and other objects and advantages of the present invention will become more apparent by describing in detail preferred embodiments thereof with reference to the attached drawings in which:

FIG. 5 illustrates a non-limiting example of layers of a communication model;

FIG. 7 illustrates a non-limiting example of a software program that is executed by the NMC system shown in FIG. 2 for monitoring a logon procedure;

FIG. 9 illustrates another non-limiting example of a software program that is executed by the NMC system shown in FIG. 2 for monitoring a logon procedure;

FIG. 11 illustrates a non-limiting example of a software instruction that analyzes data transmitted over a network in the Internet protocol ("IP") layer of the communication model shown in FIG. 5;

FIG. 12 illustrates another non-limiting example of a software instruction that analyzes data transmitted over a network in the IP layer of the communication model shown in FIG. 5;

FIG. 13 illustrates a non-limiting example of a software instruction that analyzes data transmitted over a network in the transport communication protocol ("TCP") layer of the communication model shown in FIG. 5;

FIG. 14 illustrates a non-limiting example of a software program that is executed by the NMC system shown in FIG. 2 that imposes a constraint on a variable;

FIG. 15 illustrates a non-limiting example of a software program that is executed by the NMC system shown in FIG. 2 that executes instructions relating to a timer;

FIG. 16 illustrates a non-limiting example of a software program that is executed by the NMC system shown in FIG. 2 that executes instructions relating to a meter;

FIG. 17 illustrates a non-limiting example of a software program that is executed by the NMC system shown in FIG. 2 that determines whether or not to increase the bandwidth of a data stream;

FIG. 18 illustrates a non-limiting example of a software program that is executed by the NMC system shown in FIG. 2 that executes a mergeFlow instruction; and FIG. 19 illustrates a non-limiting example of a software program that is executed by the NMC system shown in FIG. 2 that executes throw and resync instructions.

DETAILED DESCRIPTION OF THE PREFERRED EMBODIMENTS

The following description of the preferred embodiments discloses specific configurations, features, and processes. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations, features, and processes of the present invention that would have been known to one skilled in the art are omitted for the sake of clarity and brevity.

In addition, the embodiments described below contain illustrative examples of software programs. Such programs may be contained in a read only memory ("ROM"), a random access memory ("RAM"), a floppy disk, a hard disk, an optical disk, a carrier wave (e.g. a carrier wave transmitted via the Internet, a vertical blanking interval of a television signal, etc.), or any other computer readable medium. Moreover, some of the software programs may be implemented entirely via software or a combination of hardware and software. Alternatively, some of the routines may be implemented entirely in hardware.

In one non-limiting aspect, the present invention relates to software that detects and monitors events and sequences of events in a structured and hierarchical manner to enable service area network ("SAN") systems to be easily programmed.

Other non-limiting aspects of the present invention relate to a method performed by the software and a system that executes the software.

Figure 2:
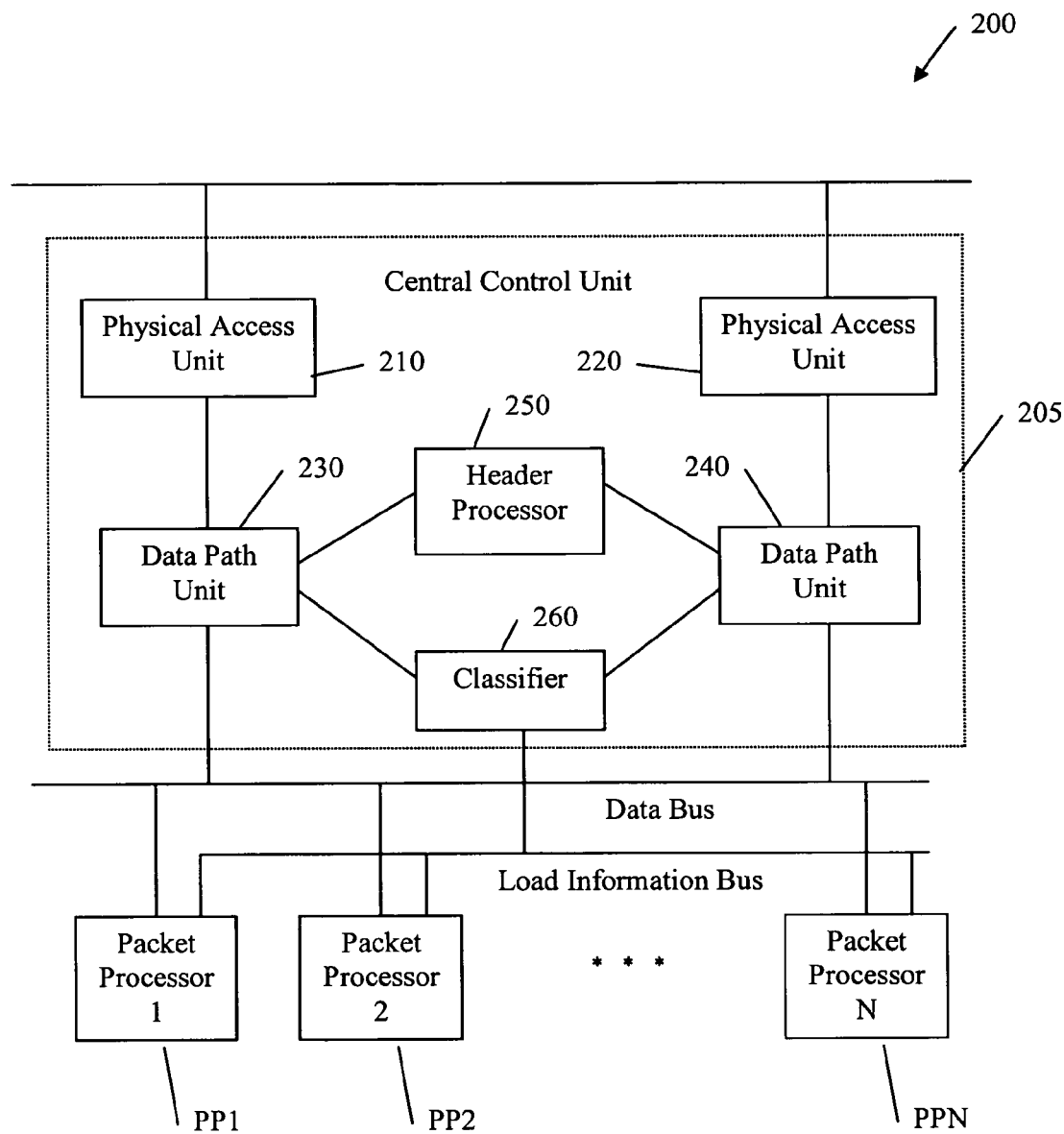
FIG. 2 illustrates a non-limiting example of the structure of a network monitoring and classifying ("NMC") system according to an embodiment of the present invention.

In one implementation of the present invention, the programming language is used to program a network monitoring and classifying ("NMC") system for processing streams of data packets belonging to one or more process flows. An illustrative, non-limiting embodiment of the system 200 is shown in FIG. 2 and comprises a central control unit ("CCU 205") and a plurality of packet processors PP1 to PPN. The packet processors PP1 to PPN are commonly referred to as network processors. Also, the CCU 205 comprises physical access units 210 and 220, data path units 230 and 240, a header processor 250, and a classifying unit 260.

The physical access unit 210 inputs data packets travelling upstream from one node to another node of the network, and the remaining components 230, 250, and 260 of the CCU 205 analyze the upstream data packets and determine the process flows that respectively correspond to the data packets. Then, the CCU 205 outputs the upstream data packets to the packet processors PP1 to PPN based on their respective process flows.

The physical access unit 220 is similar to the physical access unit 220 except that it inputs data packets travelling downstream from one node to another node of the network. Then, the remaining components 240, 250, and 260 of the CCU 205 analyze the downstream data packets and determine the process flows that respectively correspond to the data packets. Afterwards, the CCU 205 outputs the downstream data packets to the packet processors PP1 to PPN based on their respective process flows.

A more detailed description of the operation of the NMC system 200 is contained in U.S. application Ser. No. 09/541,598 ("the '598 application") and in U.S. application Ser. No. 09/606,214 ("the '214 application"). The '598 application is entitled "Apparatus and Method for Wire-Speed Classification and Pre-Processing of Data Packets in a Full Duplex Network". Also, the '598 application was filed on Apr. 3, 2000, invented by Michael Ben-Nun, Sagi Ravid, and Offer Weil, and assigned to the assignee of the present application. The '214 application is entitled "Method and Apparatus for Scalable Process Flow Load Balancing of a Multiplicity of Parallel Packet Processors in a Digital Communication Network". Also, the '214 application was filed on Jun. 29, 2000, invented by Michael Ben-Nun, Itzhak Barak, Sagi Ravid, and Offer Weil, and assigned to the assignee of the present application. Both the '598 and '214 applications are incorporated herein by reference for all purposes.

As described in the '598 and '214 applications, the each of the packet processors PP1 to PPN process data packets corresponding to a particular flow. Furthermore, each of the processors PP1 to PPN can be programmed in accordance with the software and method of the present invention described below. However, the software and method can clearly be utilized in many other types of network components and are not limited to being used only in the processors PP1 and PPN.

In any event, by utilizing the software described below, each packet processor PP1 to PPN can be programmed to detect the occurrence of an event or events that are defined by: (1) data contained in a single data packet or datagram, (2) data contained in a stream of data packets or datagrams within a process flow, (3) data contained within a plurality of streams of data packets or datagrams within a process flow, and/or (4) data contained within multiple streams of data packets or datagrams contained in multiple process flows. In addition, an event may be defined by information conveyed in any one of the seven layers of the seven-layer communication model. When one of the packet processors PP1 to PPN (e.g. the processor PP1) detects the occurrence of a particular event, the processor PP1 performs a predefined action. For example, the processor PP1 may output control signals to other nodes of the network to instruct such nodes to prepare to handle particular aspects of the event.

The manner in which the processor PP1 detects events and the predefined actions that the processor PP1 performs upon detecting one or more of the events is determined by a program created by a programmer via the software of the present invention. In one implementation, the software (as described in more detail below) is an application level programming language, and the application level program created by the software is compiled by a compiler to generate a lower level program (e.g. an assembly level program). Then, the assembly level program is supplied to the processor PP1 and controls the operation of the process.

Figure 3:
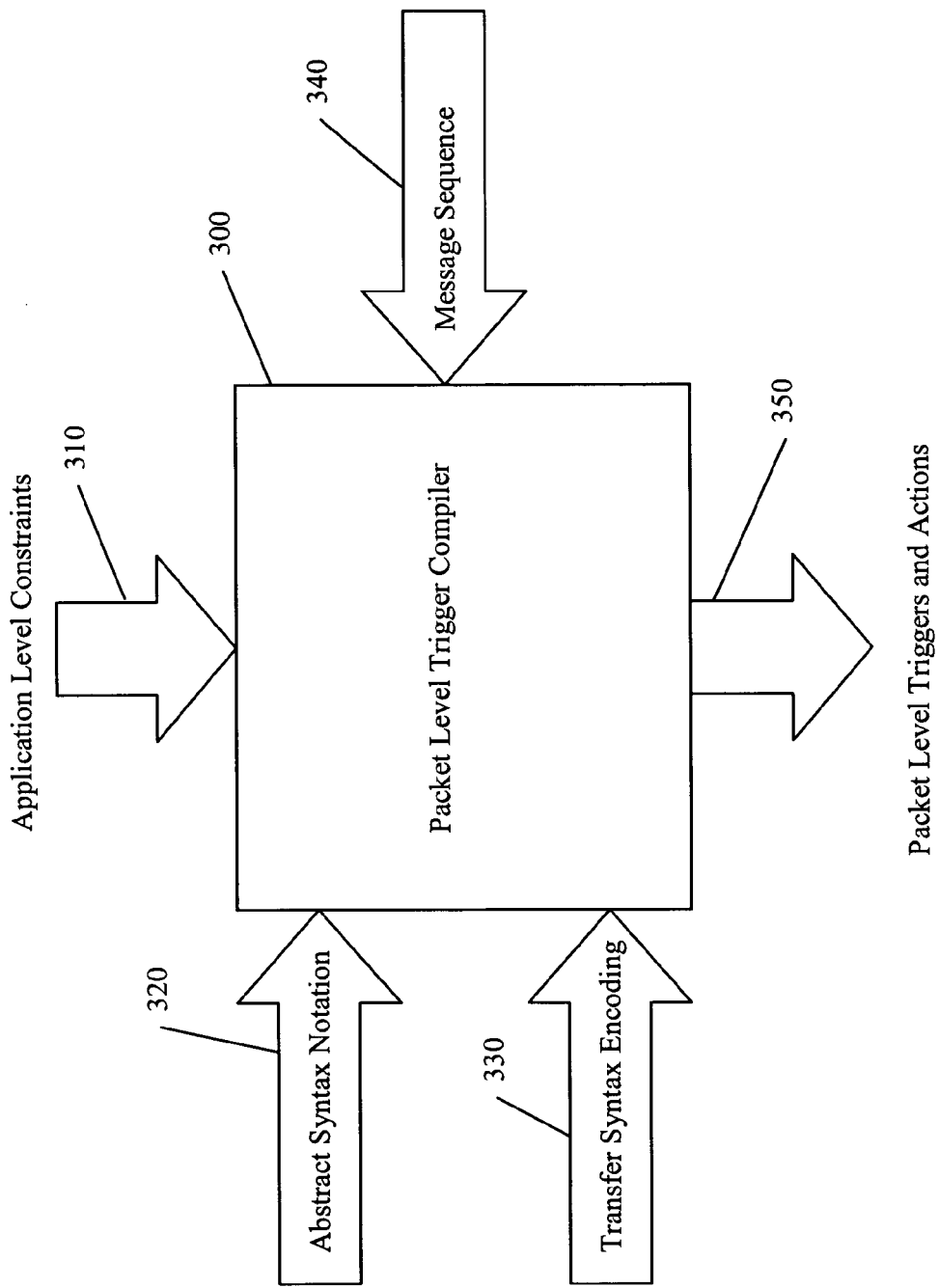
FIG. 3 illustrates a non-limiting example of the structure of a compiler according to an embodiment of the present invention.

An example of a compiler that may be used to compile the application level programming language is illustrated in FIG. 3. As shown in the figure, the compiler comprises a packet level trigger ("PLT") compiler 300 which inputs application level constraints 310, abstract syntax notation 320, transfer syntax encoding 330, and message sequence information 340.

The transfer syntax encoding 330 describes the type of data that is processed by the packet processor PP1. Specifically, the transfer syntax encoding 330 contains information that describes what type of data is being supplied to the compiler 300, and the compiler 300 utilizes such information to correctly generate the required code. For example, the transfer syntax encoding 330 may indicate that the data contains strings (e.g a stream of characters) or constants (e.g. numerical values).

The abstract syntax notation 320 describes the structure of the transfer syntax encoding 330. For example, the notation 320 may indicate that a standard encoding rule is used to encode the data packets that are being transmitted over the network and monitored by the processor PP1. For instance, the abstract syntax notation 320 may identify the overall structure of the encoding rules used in high level encoding and transfer protocols, such as the H.323 protocol. Examples of standard encoding rules include (but are not limited to) the basic encoding rules ("BER"), packet encoding rules ("PER"), and canonical encoding rules ("CER").

The message sequence information 340 indicates the manner in which a source computer (e.g. a client) and a destination computer (e.g. a server) interact to establish a communication channel between each other. In addition, the information 340 indicates the manner in which information is transferred between the source and destination computers after the communication channel is established. For example, in a network that utilizes the file transfer protocol ("FTP"), the source computer sends a request to the destination computer to establish a communication channel to transfer one or more data packets. After receiving the request, the destination computer generates and sends a confirmation to the source computer. The confirmation establishes a communication channel (or process flow) between the source and destination computer by identifying the source and destination ports of the destination computer that will used during the transfer of data packets. Subsequently, data packets are transferred between the source and destination computers. After all of the data packets have been transmitted, the source (or destination) computer sends an end of FTP sequence command to the destination (or source) computer to indicate that the transfer of data packets is complete. In such a scenario, the message sequence information 340 would inform the compiler 300 that the computers on the network transfer data in accordance with the FTP protocol.

As described above, the abstract syntax notation 320, transfer syntax encoding 330, and message sequence information 340 indicate that the network operates in accordance with standard syntax notation, syntax encoding, and message sequencing. However, the syntax notation 320, syntax encoding 330, and/or sequence information 340 may identify user defined syntax notations, syntax encoding, and message sequencing. For example, the abstract syntax notation 320 may indicate that proprietary encoding rules or proprietary transfer rules are used to encode the data packets. Upon reading the specification, one skilled in the art would understand how to develop proprietary encoding or transfer rules and generate the appropriate abstract syntax notation 320 to supply to the PLT compiler 300. Furthermore, one skilled in the art would understand how to develop user defined syntax encoding and message sequencing and generate the appropriate syntax encoding 330 and sequence information 340.

The application level constraints 310 are also input to the PLT compiler 300 and correspond the higher level program that is defined by a programmer. Such constraints are defined based on which network events need to be identified and may correspond to a constraint of any layer of the seven-layer communication model from the IP communication model layer (i.e. layer 3) to the application layer (i.e. layer 7). A detailed description of some examples of application level constraints will be described below.

After receiving such inputs 310, 320, 330, and 340, the PLT compiler 300 processes the inputs 310, 320, 330, and 340 and generates packet level triggers and actions 350. The packet level triggers and actions 350 correspond to the lower level programming code that is executed by the packet processor PP1.

In one implementation, the PLT compiler 300 may be located with the packet processor PP1. Alternatively, the compiler 300 may be located remotely from the processor PP1 and may even be located remotely from the NMC system 200 shown in FIG. 2. Also, although the description and below generally focuses on the interaction between the compiler 300 and the packet processor PP1, the compiler 300 interacts with the other processors PP2 to PPN in a similar manner. Alternatively, a plurality of compilers may interact with the processors PP1 to PPN.

In light of the disclosure in the present application, one skilled in the art clearly will know how to develop a PLT compiler 300. Also, a further description of how to develop a compiler is contained in Aho et al., *Compilers—Principles Techniques and Tools*, Addison-Wesley Publishing Company, March 1988 (reprint) ("the Aho reference"). Chapter 11 of the Aho reference, entitled "Want to Write a Compiler," and Chapter 12 of the reference, entitled "A Look at Some Compilers," provide basic information for the development of a compiler.

Figure 4:
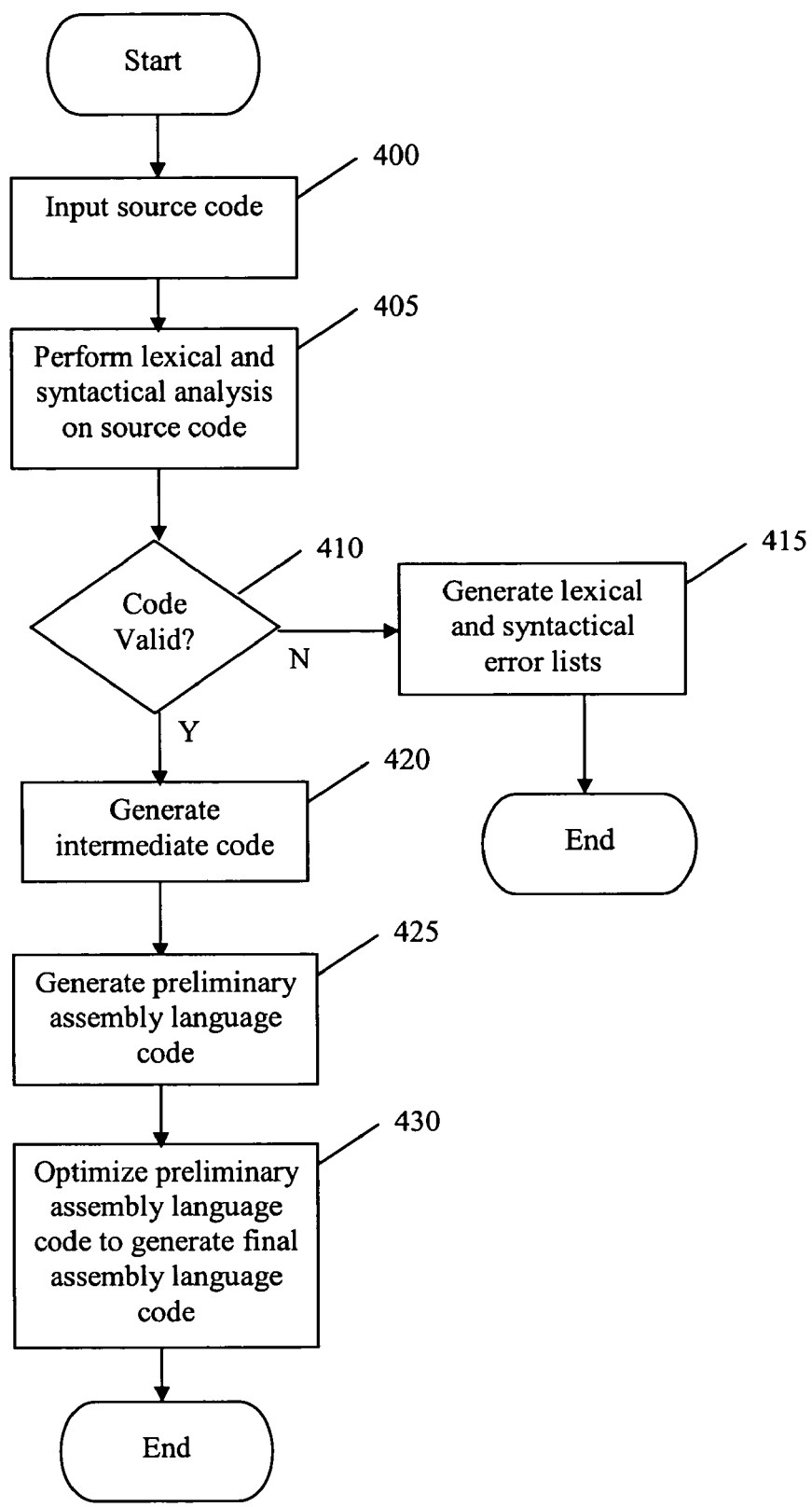
FIG. 4 illustrates a non-limiting example a routine performed by the compiler illustrated in FIG. 3.

In Chapter 12, Section 12.3, of the Aho reference, the authors provide an example of the operation of a C compiler. An illustrative example of the operation of the PLT compiler 300 shown in FIG. 3 may be based on Chapter 12 of the Aho reference and will be described below in conjunction with FIG. 4.

As shown in the figure, the source code generated by a programmer is input by the PLT compiler 300 (operation 400), and the compiler 300 performs lexical and syntactical analysis on the source code (operation 405). Based on such analysis, the compiler 300 determines if the source code is valid (operation 410). If the code is not valid, the compiler 300 generates various lexical and syntactical error lists (operation 415). These lists may include information about lexical and syntactical errors as well as pointers to the errors.

On the other hand, if the source code is valid, the compiler 300 generates an intermediate code (operation 420). The intermediate code may be a combination of either postfix or prefix notation for the expressions used in an assembly code. Also, at this stage, the compiler 300 allocates local memory to store various information and variables that are accessed later in the compiling process. Then, the compiler 300 analyzes the intermediate code to generate the preliminary assembly language code (operation 425). In particular, the expressions of the intermediate code are evaluated to form a syntax tree, and the syntax tree uniquely identifies the specific expressions of the assembly language code. Thus, the compiler 300 can easily translate the syntax tree into the preliminary assembly language code based on the specific architecture of the processor (e.g. the packet processor PP1) that will execute the code.

After the preliminary assembly language code is generated, the code is optimized by evaluating various parameters of the packet processor PP1, such as speed or memory size. The optimized code constitutes the final assembly language code that is designed to run on the packet processor PP1 (operation 430).

Although the description above describes specific operations of the PLT compiler 300, the present invention is not limited to such a description. For example, one skilled in the art would clearly understand how to develop additional routines to create a simpler or more complex PLT compiler 300.

As previously indicated, the application level constraints 310 that are input to the compiler 300 are determined based on a software program that is created via a software programming language. According to an illustrative embodiment of the invention, the software programming language enables a programmer to create a software program that defines various "events" that occur as a result of the transfer of data and which are detectable in a SAN system. The programming language is extremely flexible and enables the programmer to define events that occur at any level within the hierarchy of the seven layers of the communication model shown in FIG. 5. Furthermore, the present invention is clearly not limited to the specific communication model shown in FIG. 5 and can be used in conjunction with virtually any other communication model.

The software described above enables the programmer to identify basic events, such as identifying the fact that a certain sequence of data was contained within a packet that was transmitted between the source computer and the destination computer. On the other hand, the language enables the programmer to identify more complex events, such as identifying that a user has used the source computer to establish a telephone call. After the events are defined, the programmer can identify the action or actions that need to be performed when an event occurs. As a result, the packet processors PP1 to PPN can be simply and easily programmed to identify basic, intermediate, and complex events and performs various actions and/or generate certain control signals upon the occurrence of such events.

Specific, non-limiting examples of routines that are created by the programming languages will be described below. However, examples of some of the basic formats of the software and some examples of the various commands, instructions, modifiers, etc. of the software will be described first.

In one implementation, the software programming language is formed of a hierarchical arrangement of events, and each event can correspond to an occurrence or action that transpires in any of the layers of the communication model shown in FIG. 5, starting with the IP layer (i.e. the third layer) upwards. Each event is designated with a unique event name and may be defined by one or more instructions. For example, as shown below, an event having the event name "First_Event" is defined based on "n" instructions (i.e. Instruction 1 to Instruction n).

```
event First_Event ( ) {
    Instruction 1;
    Instruction 2;
    Instruction 3;
    ...
    Instruction n;
}
```

Depending on the nature of Instruction 1 to Instruction n, the event is deemed to have occurred when one, more than one, or all of the instructions are satisfied or have been executed.

One instruction that can be used in an event is a definition of a local variable or a local constant to be utilized in the event. An example of such an event is shown below:

```
event First_Event ( ) {
    Instruction 1;
    Local1 = 5
    Instruction 3;
    ...
    Instruction n;
}
```

As indicated above, the second instruction of the event First_Event( ) sets the local constant Local1 equal to five.

Another instruction that may be used in an event is the alias instruction. An alias instruction is used to assign an alias name to a variable (or constant or a subfield of the variable or constant). When a particular event assigns an alias name to a variable, other events can utilize the variable by referring to the alias name, within its scope of definition. An illustrative example of the format of an alias instruction is as follows:

alias<alias name>=<variable name>.

For example, in the event First_Event ( ) described above, an alias instruction can assign the constant Local1 with the alias name "reference1" as illustrated below:

```
event First_Event ( ) {
    Instruction 1;
    Local1 = 5
    alias reference1 = Local1
    ...
    Instruction n;
}
```

Once an alias name is created for a first variable (or constant or a subfield of the variable or constant) within a particular event, another event can set a second variable (or constant or a subfield of the variable or constant) equal to the first variable by referring to the alias name of the of the first variable and the name of the event that defined the first variable, provided that the first alias is within the scope of the second event. An example of the format of an instruction for setting the second variable (of a second event) equal to the first variable (of the first event) is as follows:

<second variable name>=<first event name>.<alias name>

An example of an event Second_Event ( ) which sets a constant "Local2" equal to the constant "Local1" in the event First_Event ( ) is illustrated below:

```
event Second_Event ( ) {
    Instruction 1;
    Local2 = First_Event.reference1;
    ...
    Instruction m;
}
```

According to the definition of the constant Local2 in the event Second_Event ( ), the value of the constant Local2 equals the value of the alias reference1 (i.e. the constant Local1), as defined in event First_Event ( ).

Examples of other instructions that can be used to define events include (but are not limited to) the match instruction, the concurrent instruction, the otherwise instruction, the success instruction, and the fail instruction. Furthermore, such instructions may be implemented via software, hardware, or a combination of software and hardware.

The match instruction is an instruction that performs a pattern recognition operation. For example, it can be used to determine if a particular string is contained in a packet, if a specific traffic pattern or information exists in any of the levels of the seven-level communication model, and/or if a particular traffic pattern exists in some application data type ("ADT") such as an ADT defined by the International Telecommunications Union's (X.680-X.683) ASN.1 standard. Furthermore, a programmer may create additional proprietary pattern recognition elements by using an abstract syntax or transfer notation.

The match instruction is defined based on various modifiers and constraints. For instance, an illustrative, non-limiting example of the basic format of the match instruction is as follows:

match [<modifier 1>, <modifier 2>, etc.](<constraint 1>, <constraint 2>, etc.)

In one implementation, the modifiers identify the type of data, information, or traffic pattern that is subjected to the match instruction, and the constraints identify specific values or formats of such data, information, or traffic pattern. Some examples of modifiers that may be used to create a match instruction include (but are not limited to) the var modifier, the event modifier, the immediate modifier, the flow modifier, the at modifier, the offset modifier, the length modifier, and the dir modifier.

The var modifier identifies a variable that is to be matched by the match instruction. The variable may be a variable that is predefined elsewhere in the software program. For example, the variable may identify a type of data that is included in a data packet, a type of information that is included in any one of the seven layers of the communication model, or a type of traffic pattern in one or more process flows. On the other hand, the variable may identify a predefined location within a data packet, datagram, data stream, or layer in the communication model. An example of the format of a match instruction that uses the var modifier is illustrated below:

```
match [var=var1]( )
{
    specific operation
}
```

As defined above, the match instruction determines when a variable var1 exists. Specifically, in the straight-bracketed term, the var modifier indicates that the match instruction should perform a matching operation based on the variable var1. If the packet processor PP1 is executing the match instruction and the variable var1 is defined as a type of data that is included in a data packet, the match instruction will instruct the processor PP1 to examine data packets and determine if the var1 type of data exists in one of the data packets. On the other hand, if the variable var1 is defined as a type of information that is included in a particular layer of the communication model, the match instruction will instruct the processor PP1 to examine information contained in the particular layer and determine if the var1 type of information exists. Furthermore, if the variable var1 is defined as a type of traffic pattern in a process flow, the match instruction will instruct the processor PP1 to examine the traffic patterns in the process flow to determine if the particular type of traffic pattern exists. In addition, if the variable var1 is defined in some alternative manner, the match instruction will instruct the processor PP1 to perform a matching operation in accordance with the manner in which the variable var1 is defined.

Also, as noted in the match instruction above, the parenthetical term does not include any constraints. Therefore, in a non-limiting implementation, the packet processor PP1 deems the match instruction to be satisfied as long as the variable var1 is detected, regardless of the specific value or format of the variable var1. When the match instruction is satisfied, the processor PP1 performs a "specific operation" defined within the curved-bracketed term. By using the var modifier to identify the particular variable var1 to be matched via the match instruction, the processor PP1 only needs to examine data from the relevant portions of the data packets, communication model, or process flow(s) to determine if a match exists. Thus, the processor PP1 does not unnecessarily waste time and utilize precious resources evaluating all of the information supplied to the processor PP1.

An example of a match instructions that contains a constraint is illustrated below:

```
match[var=var1](var1=0) {
    specific operation
}
```

In the example above, the match instruction is satisfied when the variable var1 exists and the variable var1 equals zero. Specifically, in the straight-bracketed term, the var modifier indicates that the match instruction should perform a matching operation based on the variable var1. Also, the parenthetical term within the match instruction indicates that the match instruction is satisfied when the variable var1 equals zero. Accordingly, in one implementation, the match instruction illustrated above instructs a packet processor (e.g. the processor PP1) to examine the data transmitted over the network, extract the fields from the data stream that correspond to the variable var1, and determine if the variable var1 equals zero.

When these conditions are met, the processor PP1 performs a "specific operation" defined within the curved-bracketed term.

The event modifier is similar to the var modifier, except that it causes the match instruction to determine if a predefined event has occurred rather than if a certain variable exists. For example, if the event First_Event ( ) has already been defined in the program, the programmer can create the following match instruction that determines if such event has occurred:

```
match[event=First_Event( )] {
    specific operation
}
```

In the straight-bracketed term, the event modifier indicates that the match instruction should determined when the event First_Event has occurred. When such event occurs, a processor (e.g. the processor PP1) is then instructed to perform a "specific operation" defined within the curved-bracketed term.

By providing a match instruction that instructs the packet processor PP1 to identify whether or not a particular event has occurred, more complex events can be defined based on less complex events that have already been predefined within the software program. For example, after the event First_Event ( ) has been defined, a programmer can program the following event:

```
Event Second_Event {
    Instruction 1;
    match[event=First_Event( )] {
        specific operation
    }
    Instruction 3;
    ...
    Instruction m;
}
```

As shown above, the event Second_Event contains m instructions. The first and third to mth instructions respectively are Instruction 1 and Instructions 3 to m, and the second instruction is the match instruction described previously. In this specific example, the event Second_Event ( ) is deemed to have occurred if the Instruction 1 and Instruction 3 are satisfied and if the match instruction is satisfied (i.e. if the event First_Event ( ) has occurred). By enabling the programmer to hierarchically define complex events based on simpler predefined events, the software program of the present embodiment provides a power and flexible tool that enables the programmer to quickly and easily program various SAN systems. Moreover, it allows for straightforward re-usability of software products previously programmed for SAN systems.

The immediate modifier is used in conjunction with the var modifier and defines the datagrams in which the match instruction is to search for the variable defined by the var modifier. In one example, a datagram is a concatenation of the payloads of a process flow. If the immediate modifier is "on", the match instruction will search for the variable identified by the var modifier only in the current datagram. In one example, the current datagram is the datagram in which the variable identified by the var modifier first occurs. On the other hand, if the immediate modifier is "off", the match instruction will search for the variable identified by the var modifier in all datagrams until a match is actually found.

For instance, a particular event that occurs on the network may initiate certain process flows between a source computer and a destination computer. In addition, various types of datagrams are transmitted between the source and destination computers via the process flows. If a match instruction searches for a particular value of a particular type of datagram in the process flows and if the immediate modifier is "on", the match instruction will search for the particular value only in the first datagram which is encountered and which is the particular type of datagram. On the other hand, if the immediate modifier is "off", the match instruction will search for the particular value in all of the datagrams that are the particular type of datagram until the match instruction is satisfied or until the certain process flows are terminated. In the above example, the datagram in which the match instruction searches for the variable could be a data packet transmitted over the network or a higher level datagram.

An example of a match instruction that uses the immediate modifier is illustrated below:

```
match[var=var1, immediate=on](var1=0) {
specific operation
}
```

In the example described above, the var modifier in the straight-bracketed term indicates that a processor (e.g. the packet processor PP1) should perform a matching operation based on the variable var1, and the parenthetical term indicates that the match instruction is satisfied when the variable var1 equals zero. In addition, the immediate modifier instructs the match instruction to determine if the variable var1 equals zero for only the current datagram and not for the subsequent datagrams. If the variable var1 equals zero within the current datagram, the packet processor PP1 performs the "specific operation" defined within the curved-bracketed term.

The flow modifier is used to identify a specific process flow to which the match instruction should be applied. An example of a match instruction that uses the flow modifier is illustrated below.

```
match[var=var1, flow=processflow1](var1=0) {
specific operation
}
```

The above match instruction instructs the processor PP1 to search for the var1 and determine if the variable var1 equals zero. Also, the flow modifier contained in the straight-bracketed term instructs the processor PP1 to only search for the variable in data belonging to the process flow "processflow1". In the present example, the term "processflow1" is a variable that is previously defined and identifies a particular process flow of data packets which are travelling over the network. If the processor PP1 determines that a data packet within the process flow processflow1 contains a variable var1 that equals zero, the processor PP1 performs the "specific operation" defined within the curved-bracketed term. In another implementation, the flow modifier will instruct the packet processor PP1 to perform the match operation over all process flows, only if the process flow defined by the variable processflow1 is detected.

The at modifier is used in a match instruction to define the location within a data packet (or other type of datagram) that needs to be evaluated. In one example, predefined keywords correspond to specific locations within a data packet (or other type of datagram), and the at modifier identifies one of the predefined keywords. Some examples of predefined keywords include (but are not limited to) the "ip" keyword, the "payload" keyword, and the "transport" keyword. The ip keyword identifies the starting offset of the IP header in the data packet (or other type of datagram). The payload keyword identifies the starting offset of the payload header in the current data packet (or other type of datagram). The transport keyword identifies the starting offset of the transport header in the data packet (or other type of datagram). The predefined keywords may be defined by the programmer or may be predefined in the software language. An example of a match instruction that uses the at modifier and the ip keyword is illustrated below.

```
match[var=var1, at=ip](var1=0) {
specific operation
}
```

The above match instruction instructs the processor PP1 to search for the var1 and determine if the variable var1 equals zero. Also, the at modifier contained in the straight-bracketed term instructs the processor PP1 to only search for the variable in the IP header in the data packet. If the processor PP1 determines that the variable var1 equals zero in the IP header of the data packet, it performs the "specific operation" defined within the curved-bracketed term.

The offset modifier is used to precisely define a location within a data packet, datagram, process flow, etc. where the packet processor PP1 should initiate a match operation. If the offset modifier is used in conjunction with an at modifier, the offset is calculated from the beginning of the location identified by the at modifier. On the other hand, if the offset modifier is not used in conjunction with an at modifier, the offset is calculated from the beginning of the data packet, datagram, process flow, etc., as the case may require.

An example of a match instruction that utilizes an offset modifier is shown below:

```
match[var=var1, at=datastream, offset=4]( ) {
specific operation
}
```

In the above example, the variable "datastream" has been previously defined as a specific stream of data corresponding to a particular process flow. As a result, the above match instruction instructs a processor (e.g. the processor PP1) to search for the variable var1. Furthermore, the at modifier instructs the processor PP1 to search for the variable var1 within the particular data stream identified by the variable datastream. Finally, the offset modifier instructs the processor PP1 to begin searching at an offset of four bytes from the first payload of the particular data stream. If the processor PP1 finds the variable var1 at the location defined by the at and offset modifiers, it performs the "specific operation" defined within the curved-bracketed term.

The length modifier informs the processor PP1 how many units of information it is instructed to examine when it performs the match instruction. An example of a match instruction that utilizes a length modifier is shown below:

```
match[var=var1, at=datastream, offset=4, length=1000]( ) {
    specific operation
}
```

In such example, the match instruction instructs a processor (e.g. the processor PP1) to search for the variable var1 within the particular data stream identified by the variable datastream. Furthermore, the processor PP1 is instructed to begin searching at an offset of four bytes from the first payload of the particular data stream. In addition, the length modifier instructs the processor PP1 to search for the variable var1 by examining only the 1000 bytes from the location identified by the offset and at modifiers. If the variable var1 is found at the location defined by the at, offset, and length modifiers, it performs the "specific operation" defined within the curved-bracketed term.

As noted above, the magnitude of the offset and length modifiers is measured in bytes. However, the present invention is not limited to such a measurement, and virtually any unit of measure can be employed.

The dir modifier instructs a processor (e.g. the processor PP1) to perform the match operation on information travelling in a particular direction. In one example, the dir modifier is set equal to the character ">" if the processor PP1 is to perform the match operation on information travelling downstream from a source computer (e.g. an initiating computer) to a destination computer (e.g. an addressee computer). On the other hand, the dir modifier is set equal to the character "<" if the match operation is to be performed on information travelling upstream from the destination computer (e.g. the addressee computer) to the source computer (e.g. the initiating computer).

An example of a match instruction that utilizes a dir modifier is shown below:

```
match[var=var1, at=datastream, offset=4, length=1000, dir=>]( ) {
    specific operation
}
```

The above example is similar to the example discussed previously, except that the processor PP1 searches for the variable var1 within the particular data stream travelling downstream from a source computer to a destination computer.

In addition to the match instruction, a concurrent instruction is another instruction that can be used to define an event. The concurrent instruction contains a plurality of "sub-instructions" and specifies that all of the "sub-instructions" will be concurrently executed until one of the instructions is successfully completed. When the one sub-instruction is successfully completed, all other sub-instructions within the concurrent instruction are terminated. Furthermore, a concurrent instruction is not satisfied when all of the sub-instructions fail. An example of a concurrent instruction is provided below.

```
concurrent {
    match[var=var1](var1=0) {
        specific operation one
    }
    match[var=var2](var2=1) {
        specific operation two
    }
}
```

The above concurrent instruction contains two match instructions. The first match instruction instructs the processor PP1 to determine if a variable var1 equals zero, and the second match instruction instructs the processor PP1 to determine if a variable var2 equals one. If the processor PP1 determines that the variable var1 equals zero, it no longer evaluates the relevant data to determine if the variable var2 equals one and performs the "specific operation one". On the other hand, if the processor PP1 determines that the variable var2 equals one, it no longer evaluates the relevant data to determine if the variable var1 equals zero and performs the "specific operation two".

The otherwise instruction is used in conjunction with a concurrent instruction or a match instruction. When the otherwise instruction is used in conjunction with a concurrent instruction, it defines an operation that is to be performed if all of the sub-instructions contained in the concurrent instruction fail. Similarly, when the otherwise instruction is used in conjunction with a match instruction, it defines an operation to be performed if the match instruction fails. An example of an otherwise instruction that is used in conjunction with a concurrent instruction is shown below.

```
concurrent {
    match[var=var1](var1=0) {
        specific operation one
    }
    match[var=var2](var1=1) {
        specific operation two
    }
    otherwise {
        specific operation three
    }
}
```

As illustrated above, if the two match instructions contained in the concurrent instruction fail, the packet processor PP1 performs the "specific operation three" defined by the otherwise instruction. In a further example, the otherwise instruction may be executed if neither of the two match instructions is satisfied within a predetermined period of time. Such predetermined period of time may be predefined by the software language. On the other hand, the period of time may be defined by the programmer and may be incorporated into the otherwise instruction as a modifier or a constraint.

Depending on the manner in which the match instruction, the immediate modifier, and the otherwise instruction are used in conjunction with each other, several types of matching scenarios may be created. For example, one scenario may utilize the following set of instructions:

```
match[var=var1, immediate=on](var1=1) {
    specific operation one
}
otherwise {
    specific operation two
}
```

In the set of instructions above, the match instruction performs a matching operation based on the variable var1, and the immediate modifier instructs the match instruction to determine if the variable var1 equals one for only the current datagram and not for the subsequent datagrams. If the variable var1 equals one within the current datagram, the packet processor PP1 performs the "specific operation one". If the variable var1 does not equal one within the current datagram, the otherwise instruction instructs the packet processor to perform the "specific operation two".

In another scenario, the following set of instructions is utilized:

```
match[var=var1](var1=1) {
    specific operation one
}
otherwise {
    specific operation two
}
```

In the set of instructions above, the match instruction performs a matching operation based on the variable var1, and since there is no immediate modifier, the match instruction to determine if the variable var1 equals one for all of the datagrams within a related set of process flows. If a variable var1 is detected within the process flows and equals one, the "specific operation one" is performed. On the other hand, if the related set of process flows terminates before a variable var1 that equals one is detected, the packet processor PP1 performs the "specific operation two". Also, in the above instruction set, the same result would occur if the match instruction contained an immediate modifier that equaled "off".

In yet another scenario, the following set of instructions is utilized:

```
match[var=var1](var1=1) {
    specific operation one
}
```

In the set of instructions above, the match instruction performs a matching operation based on the variable var1, and since there is no otherwise instruction, the match instruction will determine if the variable var1 equals one for all of the datagrams across sequential sets of process flows. In other words, the match instruction will continue to analyze the variable var1 is a first set of process flows. After the last process flow in the first set terminates, the match instruction will continues to search for the variable var1 in a second set of process flows which originates after the first set of process flows terminates. If the variable var1 is detected within any of the sets of process flows and equals one, the "specific operation one" is performed.

A success instruction and a fail instruction can also be used to define an event. Specifically, the success instruction informs a packet processor (e.g. the processor PP1) that the event containing the success instruction has been successfully completed or has occurred. Conversely, a fail instruction is used to inform the processor PP1 that the event containing the fail instruction has not been successfully completed or has not occurred. When the success or fail instruction is executed, the current event is immediately exited. An example of the use of the success and fail instructions is provided below.

```
Event First_Event ( ) {
    concurrent {
        match[var=var1](var1=0) {
            success ( )
        }
        match[var=var2](var2=1) {
            fail ( )
        }
    }
}
```

In the event First_Event, the packet processor PP1 simultaneously determines if a variable var1 equals zero and if the variable var2 equals one. If the processor PP1 determines that the variable var1 equals zero, the success instruction is executed, and the event First_Event is deemed to have occurred. On the other hand, if the processor PP1 determines that the variable var2 equals one, the fail instruction is executed, and the event First_Event is deemed to have not occurred. In order to inform the processor PP1 that the event First_Event has occurred or has not occurred, the success and fail instructions may set a flag to an appropriate value at a certain memory location of memory associated with the processor PP1.

Figure 6:
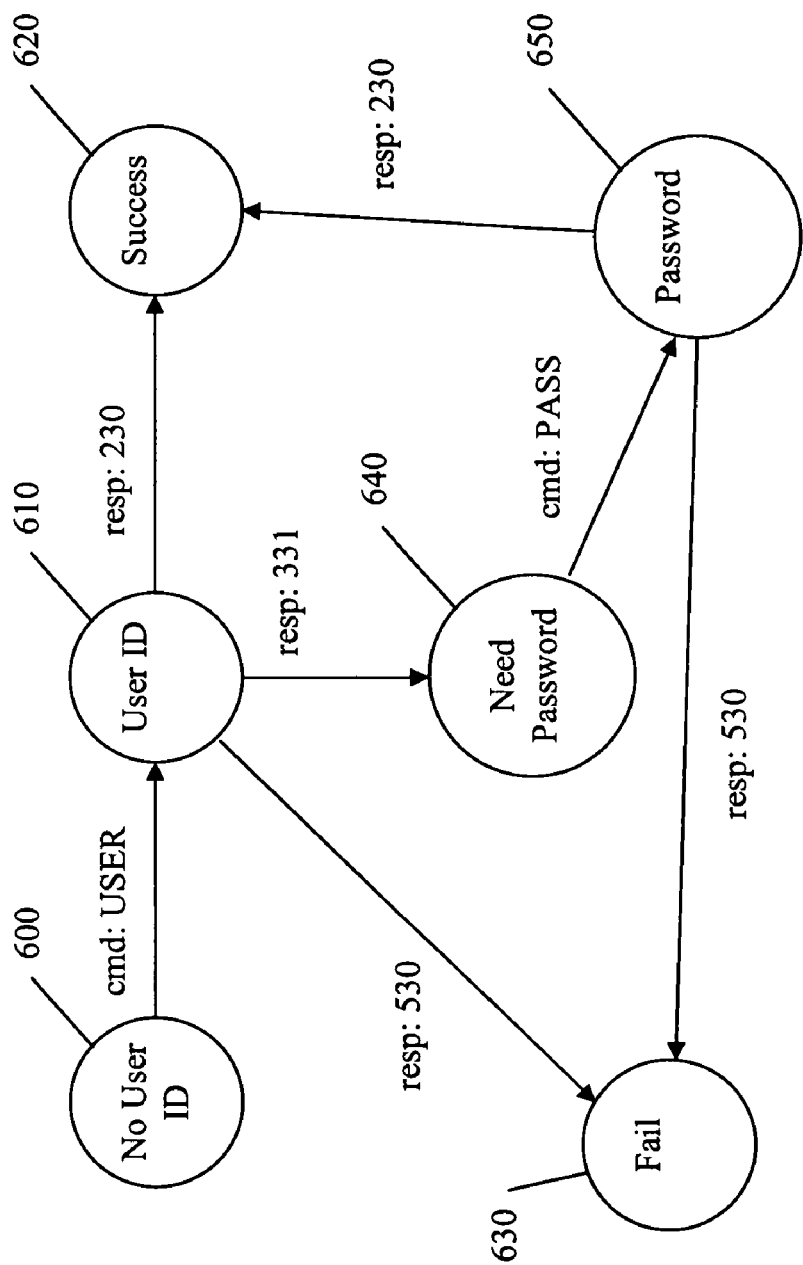
FIG. 6 illustrates a non-limiting example of a state machine for a logon procedure.

In order to better explain the programming language of the present embodiment, a simplified user logon procedure event will be described in conjunction with the state machine diagram shown in FIG. 6. As shown in the figure, the network system waits in the No User ID state 600 until a source computer (e.g. a server) sends a logon prompt to a destination computer (e.g. a personal computer operated by an end user). In the present example, the logon prompt is a file transfer protocol ("FTP") command that contains a logon prompt (e.g. "USER"). When the server sends the prompt USER, the system moves to the User ID state 610. In response to the logon prompt, the end user inputs a user identification via, for example, a personal computer, a terminal, or other appropriate input device, and the user identification is transmitted to the server.

In the User ID state 610, the server waits to receive the user identification, and when the user identification is received, the server evaluates the user identification to determine whether or not the user can logon to the server. Specifically, based on the user identification, the server may determine (1) that the user may logon to the server without a password, (2) that the user may not logon to the server, or (3) that the user may only logon to the server if the user provides a valid password.

If the user may logon to the server without a password, the server generates a successful logon FTP response code 230 and outputs the response code 230 to, for example, the personal computer of the user. In such case, the logon event is successful, and the system moves to the successful logon state 620.

If the user may not logon to the server, the server generates a failed logon FTP response code 530 and outputs the response code 530 to, for example, the personal computer of the user. In such case, the logon event has failed, and the system moves to the failed logon state 630.

If the user may logon to the server only if the user provides a valid password, the server generates a password request FTP response code 331 and supplies the response code 331 to, for example, the personal computer of the user, in the Need Password state 640. Furthermore, the server generates a password prompt (e.g. "PASS") and transmits the password prompt to, for example, the personal computer. After transmitting the password prompt, the system moves to the Password state 650 and waits for the personal computer of the user to forward a password to the server. A password may also be provided manually by the user through an input device connected, for example, to the personal computer.

When the user inputs a password to the personal computer, or the personal computer responds with a password, the server receives the password and determines if the password is valid or invalid. If the password is valid, the server generates the successful logon FTP response code 230 and outputs the response code 230 to, for example, the personal computer. In such case, the logon event is successful, and the system moves to the successful logon state 620. On the other hand, if the password is invalid, the server generates the failed logon FTP response code 530 and outputs the response code 530 to, for example, the personal computer. In such case, the logon event has failed, and the system moves to the failed logon state 630.

Figure 8:
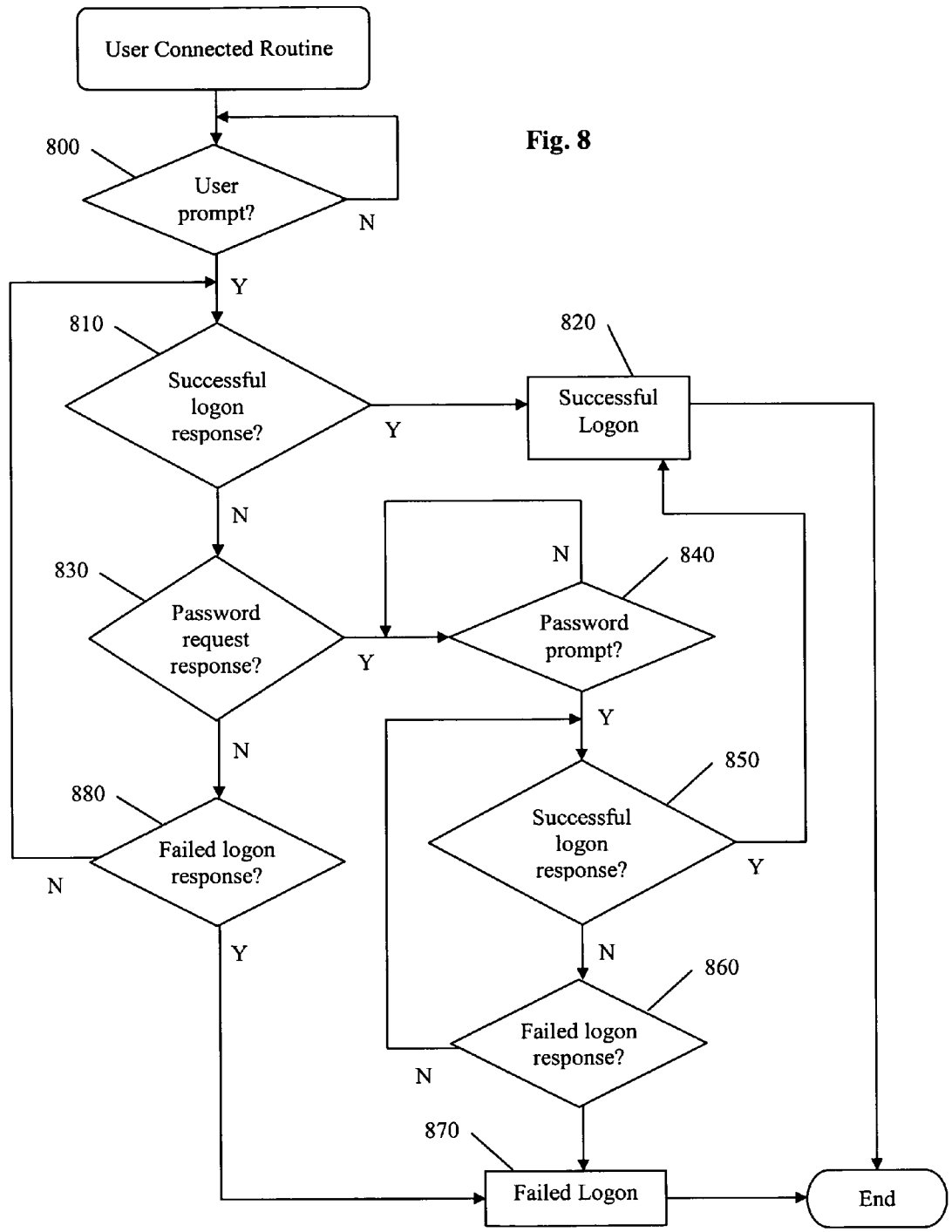
FIG. 8 illustrates a non-limiting example of a flow chart of the software program shown in FIG. 7.

With the software programming language of the present embodiment, the packet processor PP1 can be easily programmed to determine whether or not the above user logon event was attempted and whether or not the logon event was successful or unsuccessful. An example of a software program that is generated via the programming language and that instructs the processor PP1 to identify the logon event is illustrated in FIG. 7. Also, a flow chart that graphically illustrates the routine performed by the software program is shown in FIG. 8. In the description below, the references to various line numbers correspond to the line numbers of the software program shown in FIG. 7, and the references to various operations correspond to the operations in the flow chart shown in FIG. 8.

In the present example, the CCU 205 shown in FIG. 2 captures data packets transmitted upstream and downstream between the server and the personal computer of the end user and forwards relevant data packets to the packet processor PP1. The packet processor PP1 executes the software program shown in FIG. 7 for monitoring the bi-directional traffic between the personal computer and the server. Even though the present example uses a personal computer as a node of the network, other user terminals, which are not personal computers, can clearly be used. Furthermore, multiple personal computers, user terminals, or other nodal devices can be employed.

In any event, as described above, when the user initially attempts to logon to the server, the server outputs an FTP command containing the logon prompt USER. Accordingly, the packet processor PP1 waits until an FTP command sending the prompt USER is transmitted from the server to personal computer (line 702) (operation 800). Specifically, in line 702 of the software program, the match instruction instructs the processor PP1 to examine whether or not the variable FTP_Cmd exists in the information transmitted between the server and the personal computer. In this example, the variable FTP_Cmd has been defined as the FTP command, and thus, the match instruction in line 702 instructs the packet processor PP1 to determine if an FTP command is detected. In addition, the match instruction has a constraint that instructs the processor PP1 to determine if the FTP command equals the user logon prompt USER. In this example, the term "USER" has been previously defined as a particular constant corresponding to the user login request code. Therefore, the term "USER" does not need to be set equal to any particular value in the constraint because the term itself represents a particular constant. In the present non-limiting example, the prompt USER is a system prompt that prompts the user to input a user identification.

After the personal computer receives the logon prompt USER and the personal computer of the end user displays a corresponding prompt, the user inputs a user identification. The user identification is transmitted to the server, and the server responds by transmitting one of three possible responses to the computer. In particular, if the user identification indicates that the end user can logon to the server without a password, the server allows the end user to logon and transmits an FTP response containing the successful logon code 230. If the user identification indicates that the end user can logon only if a valid password is provided, the server requests the end user to input a valid password by transmitting an FTP response containing the password request code 331. Finally, if the user identification indicates that the end user cannot logon to the server (with or without a password), the server does not allow the end user to logon and transmits an FTP response containing the failed logon code 530.

Thus, after the packet processor PP1 detects the FTP command containing the logon prompt USER, it concurrently searches for the successful logon code 230, the password request code 331, and the failed logon code 530 transmitted in an FTP response from the server (lines 704, 706, 710, and 727) (operations 810, 830, and 880).

In particular, the concurrent instruction in line 704 instructs the packet processor PP1 to concurrently execute the match instructions in lines 706, 710, and 727 until one of the match instructions is satisfied. The match instruction in line 706 instructs the processor PP1 to determine whether or not the variable FTP_Resp exists in the information transmitted between the personal computer and the server. In this example, the variable FTP_Resp has been defined as an FTP response, and thus, the match instruction in line 706 instructs the packet processor PP1 to determine if an FTP response is detected. In addition, the match instruction has a constraint that instructs the processor PP1 to determine if a variable Code equaling 230 exists within the FTP response. In this example, the variable Code is previously defined as at least a portion of the FTP response that contains information responding to the user identification provided by the user. Since the term "Code" is a variable and is not a constant (as in the case of the term "USER"), the constraint contained in the match instruction in line 706 sets the variable Code equal to the value 230. Since the value 230 corresponds to a successful logon response code, the match instruction in line 706 instructs the processor PP1 to determine if the server has transmitted an FTP response containing the successful logon response code 230 in response to the user identification (operation 810). If the FTP response contains the code 230, the packet processor PP1 determines that the user has successfully logged on and that the event FTP_User_Connected has occurred (line 708) (operation 820).

While the match instruction in line 706 is being executed, the match instruction in line 710 is examined against the data stream. Such match instruction instructs the processor PP1 to examine the information contained in the FTP response and determine if such information equals the password request code 331 (line 710) (operation 830). In other words, the processor PP1 determines if the server requires the user of the personal computer to input a valid password before logging on.

If the FTP response contains the code 331, the processor PP1 executes the match instruction in line 712. Such match instruction instructs the processor PP1 to examine the information contained in the FTP commands transmitted from the server to the personal computer and to determine if such information equals the password prompt PASS (line 712)

(operation 840). In other words, the processor PP1 determines if the server has prompted the personal computer for a password.

If an FTP command contains the password prompt PASS, the concurrent instruction in line 714 instructs the packet processor PP1 to concurrently execute the match instructions in lines 716 and 720 until one of the match instructions is satisfied (operations 850 and 860). The match instruction in line 716 instructs the processor PP1 to examine the information contained in the FTP responses transmitted from the server and determine if such information equals the successful logon response code 230 (operation 850). If the FTP response contains the code 230, the packet processor PP1 determines that the user has successfully logged on and that the event FTP_User_Connected has occurred (line 718) (operation 820).

While the match instruction in line 716 is being executed, the match instruction in line 720 instructs the processor PP1 to examine the information contained in the FTP responses and determine if such information equals the failed logon response code 530 (operation 860). If the FTP response contains the code 530, the packet processor PP1 determines that the logon attempt has failed and that the event FTP_User_Connected has not occurred (line 722) (operation 870).

Similarly, while the match instruction in lines 706 and 710 are being executed, the match instruction in line 727 instructs the processor PP1 to examine the information contained in the FTP responses and determine if such information equals the failed logon response code 530 (operation 880). If the FTP response contains the code 530, the packet processor PP1 determines that the logon attempt has failed and that the event FTP_User_Connected has not occurred (line 729) (operation 870).

For the purpose of managing and monitoring the traffic on the network system, the NMC system 200 may not need to analyze every detail of the data communication between the personal computer of the end user and the server. For example, merely identifying the fact that the end user attempted to logon to the server and that the attempt was successful or unsuccessful may be sufficient. In such a scenario, a programmer does not need to define the event FTP_User_Connected in accordance with all of the detailed procedural paths used to establish whether or not an end user has successfully logged on to the server.

Figure 10:
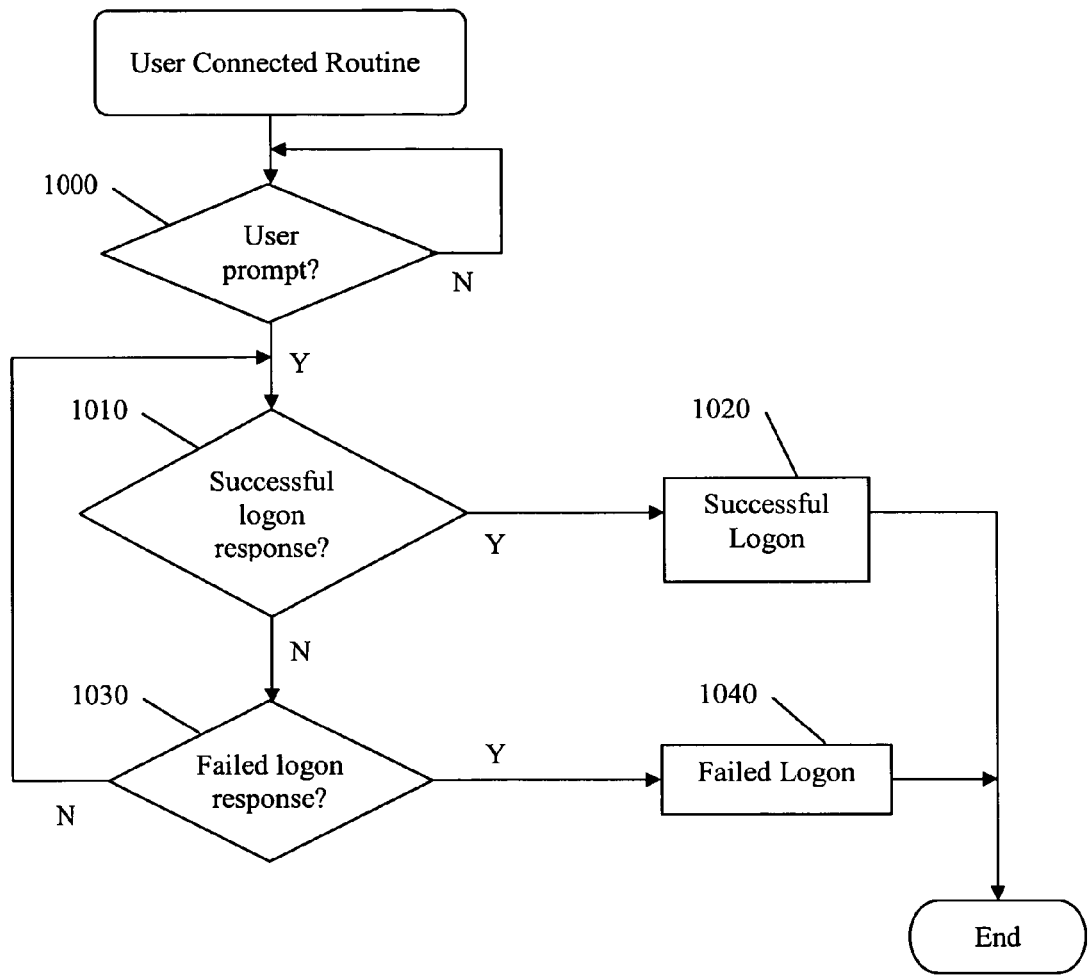
FIG. 10 illustrates a non-limiting example of a flow chart of the software program shown in FIG. 9.

An example of a more simplified version of a software program that instructs the processor PP1 to identify the logon event is illustrated in FIG. 9. Also, a flow chart that graphically illustrates the routine performed by the software program is shown in FIG. 10. Again, in the description below, the references to various line numbers correspond to the line numbers of the software program shown in FIG. 9, and the references to the various operations correspond to the operations in the flow chart shown in FIG. 10.

As in the previous example, a logon attempt to the server begins with the server outputting an FTP command containing the logon prompt USER. Accordingly, the packet processor PP1 detects if an FTP command having the prompt USER is transmitted from the server to the personal computer (line 902) (operation 1000).

After the logon prompt USER is transmitted from the server to the personal computer, the server eventually responds by transmitting one of two possible responses to the computer. Specifically, the server ultimately transmits an FTP response that either contains a successful logon code 230 or a failed logon code 530. Thus, after the packet processors PP1 detects the FTP command containing the prompt USER, it concurrently searches for the successful logon code 230 or the failed logon code 530 transmitted in an FTP response from the server (lines 904, 906, and 910) (operations 1010 and 1030).

In particular, the concurrent instruction in line 904 instructs the packet processor PP1 to concurrently execute the match instructions in lines 906 and 910 until one of the match instructions is satisfied. The match instruction in line 906 instructs the processor PP1 to examine the information contained in the FTP responses and determine if such information equals the successful logon response code 230 (operation 1010). If the FTP response contains the code 230, the packet processor PP1 determines that the user has successfully logged on and that the event FTP_User_Connected has occurred (line 908) (operation 1020).

Concurrently with the match instruction in line 906, the match instruction in line 910 is executed. Such match instruction instructs the processor PP1 to examine the information contained in the FTP response and determine if such information equals the failed logon response code 530 (operation 1030). If the FTP response contains the code 530, the packet processor PP1 determines that the logon attempt has failed and that the event FTP_User_Connected has not occurred (line 912) (operation 1040).

As described above, both of the software programs shown in FIGS. 7 and 9 monitor the same user logon event, which occurs in the application layer of the communication model. However, the program in FIG. 7 is designed to have the processor PP1 monitor more details regarding the logon event, whereas the program in FIG. 9 is designed to have the processor PP1 determine whether or not the end user ultimately logged on to the server. Accordingly, the software program language of the present embodiment enables a programmer to flexibly define events very specifically or very vaguely, depending on the desired operation of the NMC system 200.

Also, the logon procedures described above are much simpler than an actual logon procedure and have been simplified for the sake of brevity and clarity in explaining the above embodiments of the present invention. Since an actual logon procedure may be much more complex than the above-explained procedure, the advantages of the present invention are even more apparent when the present invention is used to monitor actual network events and occurrences.

In the above examples of the match instruction, the packet processor PP1 is instructed to search in a particular location (e.g. the FTP response) within a data flow and determine if the information contained in the FTP response equals a particular value (e.g. the code 230). However, the match instruction can be further defined so that the processor PP1 performs a more specific and specialized matching function. For example, the match instruction may be defined so that it instructs the packet processor PP1 to determine if a data stream contains very specific information. An example of such a match instruction is provided below.

match [var=HTTPrequest](uri="/index.htm", httpVer="1.1", method.get)

The terms "HTTPrequest," "uri," and "httpVer" may be variables that are previously defined by the programmer in another portion of the software language. Alternatively, the variables may correspond to predetermined variables that are already understood by the software language and do not have to be defined by the programmer. In any event, in the present example, the variable HTTPrequest corresponds to known format of the header of a request command in a hyper-text transfer protocol ("HTTP") standard. The variable "uri" corresponds to a universal resource indicator contained in the request command, and the variable "httpVer" corresponds to an HTTP version relating to the request command. Also, in the present example, the term "method.get" is an HTTP method that performs a get request and is previously defined. In particular, the HTTP standard includes many predefined methods, and one of the methods is a get method and is identified in the standard by the term "method.get".

Accordingly, in executing the above match instruction, the packet processor PP1 will determine that the match instruction is satisfied if an HTTP message is transmitted over the network and has a header that indicates (1) that the message is within a "method.get" request, (2) that the "method.get" request is for a universal resource indicator ("uri") corresponding to the index.htm resource (i.e. uri="/index.htm"), and (3) that the message is involved in an HTTP version 1.1 transaction (i.e. httpVer="1.1"). By enabling the programmer to impose multiple constraints for the matching function, the match instruction significantly simplifies the ability to program complex matching sequences. Furthermore, such ability enables the programmer to impose content restrictions as well as structural restrictions in a matching operation.

In another embodiment, the match instruction may be used in supporting rapid classification of packet traffic as belonging to certain protocols by looking deep into the packet payload. Because of the proliferation of proprietary protocols in use on the Internet, it is desirable that a monitoring device be rapidly configurable to support new signatures with the flexibility offered by an open programming language, such as that defined hereinabove. The match instruction can be used to identify peer-to-peer (P2P) traffic using the BitTorrent protocol, for example, using the following sample code:

```
BITTORRENT_DOWNLOAD_MSG ::= SEQUENCE
{
    _ "\19",
    _ "BitTorrent protocol"
};
match[ dir=>, BITTORRENT_DOWNLOAD_MSG( )]
{
//successfully identified a bittorrent download flow
}
```

In another implementation, the software language of the present embodiment is capable of imposing a constraint on a variable. A non-limiting example of a program that imposes such a constraint is illustrated in FIG. 14.

As shown in lines 1400-1404 of the figure, a variable type is defined as a sequence of two integers. An example of the general format for defining a variable type is as follows:

```
<variable type name> ::= <variable type>
{
    <content of variable type>
}
```

Accordingly, in line 1400, the variable type is a "sequence" variable type and is designated with the name "anADTType". Also, in lines 1402 and 1403, the variable type contains two integers f1 and f2. Thus, anADTType variable type is a sequence of two integers f1 and f2.

A more detailed description of an example of the "sequence" variable type, as well as other variable types, is contained in U.S. application Ser. No. 09/717,295 ("the '295 application"). The '295 application is entitled "A Structured and Hierarchical Method for Representation and Parsing of Textual Patterns". Also, the '295 application was filed on Nov. 22, 2000, invented by Oren Ravoy and Doron Shamia, and assigned to the assignee of the present application. The '295 application is incorporated herein by reference for all purposes.

In lines 1414-1422 of the program, an event A2( ) is defined. In the event A2( ), a variable "aLocalVar" is defined as anADTType variable type (line 1416). In the present example, the basic format of defining a variable as a particular type is as follows:

<variable type name><variable name>

After the variable "aLocalVar" has been defined, the event A2( ) defines an alias name "anAlias" based on the variable "aLocalVar". Specifically, in line 1417, the alias instruction assigns the alias name "anAlias" to a subfield of the variable "aLocalVar". An illustrative example of the format of an alias instruction that assigns the subfield of a variable an alias name is as follows:

alias<alias name>=<variable name>.<subfield>

Thus, in line 1417, the alias instruction assigns the integer f1 of the variable "aLocalVar" with the alias "anAlias". In other words, the alias "anAlias" is considered a variable that is equal to the integer f1 of the variable "aLocalVar" and can be used by other events besides the event A2( ).

Lines 1406-1412 of the program in FIG. 14 define an event A1( ). In line 1408 of the event A1( ), a match instruction determines if the event A2( ) has occurred. Furthermore, the parenthetical term of the match instruction contains a constraint on the matching operation. Specifically, the parenthetical term requires the alias "anAlias" in event A2( ) to equal two (i.e. requires the integer f1 of the variable "aLocalVar" to equal two). In other words, the match instruction in line 1408 requires (1) the event A2( ) to have occurred and (2) the integer f1 of the variable "aLocalVar" in the event A2( ) to equal two. Thus, as described above, the match instruction in line 1408 places a constraint on the value of the variable "aLocalVar" defined in the event A2( ).

In addition to imposing a constraint on a variable by referring to an alias, the use of an alias is not required. For example, a constraint can be imposed on a variable by identifying the actual variable and the constraint in a parenthetical term of a match instruction or an event instruction. Also, besides constraining a variable to equal a particular value, the variable may be constrained to not equal a certain value, to fall within a range of values, or to not fall within a range of values.

One of the advantages of the software language of the present embodiment is that it enables a programmer to define events based on instructions that analyze messages in any one of the several communication layers illustrated in the standard communication model shown in FIG. 5. For example, FIG. 11 illustrates an example in which a match instruction analyzes data that is transmitted over the network in the IP layer of the communication model.

As shown in the figure, the event QoSValue( ) is defined to occur when data transmitted in the IP layer equals a particular value. Specifically, in the square-bracketed term, the var modifier indicates that the match instruction should perform a matching operation based on the variable IPHeader. The variable IPHeader may be previously defined by the programmer or may be a predefined variable within the software language that identifies the IP header within a message or datagram. In addition, the at modifier is set equal to the keyword "ip". Thus, the at modifier instructs the processor PP1 to evaluate data located with the Internet protocol ("IP") layer of the communication model. Also, the immediate modifier is set equal to "off", and thus, the packet processor PP1 evaluates the data contained within the IP header for each message or data packet until the match instruction is satisfied.

Furthermore, the parenthetical term instructs the processor PP1 to determine if a sub-field at the location defined by the square-bracketed term equals a particular value. Specifically, the parenthetical term instructs the processor PP1 to determine if the TOS variable equals the value HIGH. In this example, the TOS variable has been previously defined and corresponds to the type of service ("TOS") bit contained in a sub-field of the IP header. Also, the value "HIGH" is a constant (e.g. "1") that is previously defined elsewhere in the software program.

Accordingly, the match instruction instructs the processor PP1 to evaluate the TOS bit sub-field contained in the IP header of sequential messages or data packets until the value of a TOS bit sub-field equals the constant "1". When the value in one of the TOS bit sub-fields equals the constant "1", the processor PP1 determines that the event QoSValue1( ) is successful and has occurred.

FIG. 12 illustrates the software routine that defines an event QoSValue2( ) similarly to the manner in which the event QoSValue1( ) shown in FIG. 11 is defined. However, in the event QoSValue2, the immediate modifier within the match instruction is set equal to "on", and an otherwise instruction is used in conjunction with the match instruction.

Since the immediate modifier is set equal to "on", the match instruction instructs the packet processor PP1 to only evaluate the TOS bit sub-field contained in the IP header of the first datagram that it receives and that contains the IP header. If the value of the TOS sub-field equals the constant "1", the processor PP1 executes the success( ) instruction and determines that the event QoSValue2( ) has occurred. If the value of the TOS sub-field in the first datagram does not equal "1", the otherwise instruction is executed. In such case, the packet processor PP1 executes the fail( ) instruction and determines that the event QoSValue2( ) has not occurred and has failed.

FIG. 13 illustrates an example in which a match instruction analyzes data that is transmitted over the network in the transport communication protocol ("TCP") layer of the communication model. Specifically, as shown in the figure, the event UrgentSegment( ) is defined to occur when data transmitted in the TCP layer equals a particular value. Specifically, in the square-bracketed term, the var modifier instructs the packet processor PP1 to evaluate data contained at a location defined by the variable TCPheader. The variable TCPheader may be previously defined by the programmer or may be a predefined variable within the software language that identifies the TCP header within a message or data packet in the data stream. In addition, as described above, since the at modifier is set equal to the keyword "transport", the at modifier instructs the processor PP1 to evaluate data located in the fourth layer (i.e. the transport layer) of the communication model. Also, the immediate modifier is set equal to "off", and thus, the packet processor PP1 evaluates the data contained at a particular location within the TCP header of sequential messages or data packets until the match instruction is satisfied.

Furthermore, parenthetical term instructs the processor PP1 to determine if a sub-field at the location defined by the square-bracketed term equals a particular value. Specifically, the parenthetical term instructs the processor PP1 to determine if the DPORT sub-field within the TCP header has a value that equals the value "21".

Accordingly, the match instruction instructs the processor PP1 to evaluate the DPORT sub-field contained in the TCP header of sequential messages or data packet to determine if the value of the DPORT sub-field equals the value "21". When the value in one of the DPORT sub-fields equals the value "21", the processor PP1 determines that the event UrgentSegment( ) is successful and has occurred.

Another instruction that can be implemented by the software program of the present embodiment is the SANTimer_t instruction. The SANTimer_t instruction defines a timer that can be used to time various events or occurrences being monitored by the processor PP1. An example of the general format of such instruction is shown below:

SANTimer_t<timer name>

Thus, in order to define a timer with the name "myTimer", the following instruction would be created:

SANTimer_t myTimer

A timer that is defined by the SANTimer_t instruction will count until a boundary is reached, and afterwards, the timer will stop and generate a flag indicating that the boundary has been reached. Once a timer is defined, a set( ) command can be used to assign various properties to the timer. In one implementation, the various properties assigned to the timer instruct the timer to count in a particular manner. Examples of such properties are the value property, the direction property, the resolution property, and the bound property.

The value property contains the initial value of the timer, and the direction property indicates the direction in which the counter will count. For example, the counter can count by incrementing its value (i.e. count up) or by decrementing its value (i.e. count down). Also, the resolution property indicates the unit of time that will be used to increment or decrement the count value. For instance, the resolution property may indicate that the count value is incremented or decremented every second, every millisecond, etc. Finally, the bound property is used to define the upper or lower boundary for the count value. In other words, the value property identifies the starting value of the timer and the bound property identifies the ending value of timer. Thus, the timer counts from the value defined in the value property to the value defined in the bound property. In addition, if the boundary property is set equal to the value "−1", the timer continually increments (or decrements) the count value, and an upper (or lower) boundary is not set. In other words, the timer counts endlessly until it is instructed to stop counting from a separate command.

An example of the basic format of a set command that is used to assign various properties to a timer is as follows:

<timer name>.set(value=<value property value>, direction=<direction property value>, resolution=<resolution property value>, bound=<bound property value>)

In the following specific example, the set command assigns properties to the timer "myTimer" to instruct it to count down from an initial value of ten to a final value of zero and to decrement its count every millisecond:

myTimer.set(value=10, direction=down, resolution=mili, bound=0)

Once a timer is defined and assigned various properties, other commands may be utilized to control the timer. Examples of other command include (but are not limited to) the start( ) command, the pause( ) command, the resume( ) command, the stop( ) command, and the timeout( ) command.

The start command( ) instructs the timer to start counting, and the pause( ) command instructs the timer to temporally stop counting. The resume( ) command is issued after the pause( ) command and instructs the timer to resume counting from the value contained in the timer when the pause( ) command was issued. The stop( ) command instructs the timer to stop counting. Furthermore, after the stop( ) command, the timer may reset its count value to the initial value defined by the value property discussed above. Finally, the timeout( ) command is used when a certain code has to be executed upon successful termination (or timeout) of a timer operation.

Examples of the generic formats of the various commands above are shown below:

```
<timer name>.start( )
<timer name>.pause( )
<timer name>.resume( )
<timer name>.stop( )
<timer name>.timeout( )
```

A specific example using some of the above properties and commands is shown in FIG. 15. As shown in the figure, the SANTimer_t instruction defines a timer with the name "myTimer" (line 1500). Also, in line 1502, the set( ) command assigns properties to the timer "myTimer" to instruct it to count down from an initial value of ten to a final value of zero and to decrement its count every millisecond. In line 1504, the start( ) command instructs the timer "myTimer" to begin counting down from ten, and before the timer "myTimer" reaches zero, the timeout( ) command in line 1511 is "false". When the timeout( ) command is false, the "specific operation" at lines 1512-1514 is not executed. However, after the timer "myTimer" reaches zero, the timeout( ) command is "true", and the "specific operation" at lines 1512-1514 is executed.

Of course the specific properties, property values, and commands described above are merely examples of many possible properties, values, and commands that can be implemented in the present invention. Moreover, upon reading the present specification, one skilled in the art clearly would understand the many other properties, values, and commands that may be used.

In addition to counting time via the SANTimer_t instruction, the SANMeter_t instruction can be implemented by the software program of the present embodiment to count or measure quantities besides time. For example, the SANMeter_t instruction defines a meter to measure quantities such as bytes, packets, or events. An example of the general format of such instruction is shown below:

SANMeter_t<meter name>

Thus, in order to define a meter with the name "myMeter", the following instruction would be created:

SANMeter_t myMeter

As in the case of a timer, a meter that is defined by the SANMeter_t instruction will count until a boundary is reached, and afterwards, the meter will stop and generate a flag indicating that the boundary has been reached. Once a meter is defined, the set( ) command can be used to assign various properties to the meter. In one implementation, the various properties assigned to the meter instruct the meter to count in a particular manner. Examples of such properties are the metric property, the flowUN property, and the bound property.

The metric property defines the types of quantities to be measured or counted. Examples of such quantities include (but are not limited to) bytes, datagrams, and events. The flowUN property identifies united process flows and instructs the meter to measure quantities contained in all of the united process flows. In one example, data or information belonging to process flows that are related to each other or united with each other contain a "unite number" or a "flow index number" ("FIN") to inform the packet processors PP1 to PPN of such fact. For example, united or related process flows belonging to a first group may contain the unite number "1", and united or related process flows belonging to a second group may contain the unite number "2". Thus, if the flowUN property contains the property value "1", the meter may measure the quantities contained in the first group of process flows. On the other hand, if the flowUN property contains the property value "2", the meter may measure the quantities contained in the second group of process flows. In addition, if the flowUN property contains the property value "–1", the meter may measure all process flows, regardless whether or not any of the process flows are united or related.

A more detailed description of an illustrative, non-limiting manner of generating a "unite number", which may also be referenced as "merge number" or a "flow index number" ("FIN"), is contained in U.S. application Ser. No. 09/715,152 ("the '152 application"). The '152 application is entitled "An Apparatus and Method for Bundling Associated Network Process Flows in Service Aware Networks". Also, the '152 application was filed on Nov. 20, 2000, invented by Michael Ben-Nun, Sagi Ravid, Offer Weil, Rony Gotesdyner, and Oren Ravoy, and assigned to the assignee of the present application. The '152 application is incorporated herein by reference for all purposes.

Finally, the bound property is used to control a meter in a manner that is similar to manner in which it is used to control a timer.

In one implementation, a set command is used to assign various properties to a meter in a manner that is similar to the way in which a set command is used to assign properties to a timer. An example of the format of such a set command is shown below:

```
<meter name>.set(metric=<metric property value>, flowUN=<flowUN
    property value>, bound=<bound property value>)
```

In the following specific example, the set command assigns properties to the meter "myMeter" to instruct it to count the number of bytes in all process flows until the count value equals 1000:

myMeter.set(metric=bytes, flowUN=–1, bound=1000)

Once a meter is defined and assigned various properties, other commands may be utilized to control the timer. Examples of other commands include (but are not limited to) the start( ) command, the pause( ) command, the resume( ) command, the stop( ) command, and the timeout( ) command. The formats and operations of such commands are analogous to the formats and operations described above in conjunction with timers.

A specific example using some of the above properties and commands is shown in FIG. 16. As shown in the figure, the SANMeter_t instruction defines a meter with the name "myMeter" (line 1600). Also, in line 1602, the set( ) command assigns properties to the meter "myMeter" to instruct it to count the number of bytes in all process flows until 1000 bytes are counted. In line 1604, the start( ) command instructs the meter "myMeter" to begin counting. After the meter begins counting, the match instruction instructs the processor PP1 to perform a certain matching operation (line 1606). Furthermore, the dir modifier in the match instruction restricts the matching operation to be performed in only the flow of packets moving from a source computer to the destination computer. In addition, in line 1611, the pause ( ) command instructs the meter myMeter to pause counting the number of bytes, and an if instruction determines if the counted value (i.e. myMeter.value) of the meter is greater than 100. If the counted value is greater than 100, a "specific operation" is performed (lines 1614-1616). Afterwards, the myMeter.resume( ) command instructs the meter resume counting the bytes.

Of course the specific properties, property values, and commands described above are merely examples of many possible properties, values, and commands that can be implemented in the present invention. Moreover, upon reading the present specification, one skilled in the art clearly would understand the many other properties, values, and commands that may be used.

Another example of the flexibility of software program of the present embodiment is shown in FIG. 17. In this example, a hierarchy of events are used to examine data packets to determine whether or not a high quality of service is requested and to determine the amount of jitter experienced in the communication network. Also, the value of the type of service ("TOS") bit is assumed to indicate whether or not a high quality of service is requested and a real time protocol ("RTP") is assumed to be used. In addition, the amount of jitter in the network is defined as the statistical variance of the RTP data packet inter-arrival time (i.e. the time required for a data packet to travel from its source to its destination). When such time exceeds a certain value or threshold, the amount of jitter is relatively large and certain measures must be taken to ensure a reasonable quality of service. One measure that can be taken to ensure a reasonable quality of service is to increase the available bandwidth for the packet stream to reduce the jitter in the system. Although the program in FIG. 17 is created based on a hierarchy of events to perform the functions above, the software program of the present embodiment is not required to be created in such fashion. For example, upon reading the present application, one skilled in the art would know how to create the program entirely via sequential instructions.

Nonetheless, turning to FIG. 17, the illustrative, non-limiting routine comprises three events. The first event is the event QoSHigh( ) (lines 1700-1705) and determines whether a high quality of service is requested. The second event is the event HighJitter( ) (lines 1707-1733) and determines if the amount of jitter in the RTP layer of the communication model (i.e. the seventh layer) exceeds a predetermined threshold. Finally, the third event is the event IncreaseBandwidth( ) (lines 1735-1744) and determines whether or not the available bandwidth for the packet stream needs to be increased to reduce the jitter in the system.

In the event QoSHigh( ), a match instruction performs a matching operation based on the variable IPHeader (line 1702). In the present example, the variable IPHeader has been previously defined to identify the IP header within a datagram. In addition, the at modifier is set equal to the keyword "ip". Thus, the at modifier instructs the processor PP1 to evaluate data located within the IP layer of the communication model. Also, the constraint in parenthetical term of the match instruction instructs the processor PP1 to determine if the TOS variable equals the value QOS_HIGH. In this example, the TOS variable has been previously defined and corresponds to the type of service ("TOS") bit contained in a sub-field of the IP header. Also, the value "QOS_HIGH" is a constant (e.g. "1") that is previously defined elsewhere in the software program.

Accordingly, the match instruction instructs the processor PP1 to evaluate the TOS bit sub-field contained in the IP header of sequential messages or data packets until the value of a TOS bit sub-field equals the constant "1". When the value in one of the TOS bit sub-field equals the constant "1", the processor PP1 determines that the event QoSHigh( ) is successful and has occurred (line 1704).

In the event HighJitter( ), the amount of jitter in the network is measured in the RTP level of the communication model. In this event, a timer "jitterTimer" is defined (line 1709), and a set command defines the various properties of the timer (line 1710). In line 1711 of the event HighJitter( ), the term "int32" indicates that one or more variables are being defined. The "int" portion of the term indicates that the variables are integers, and the "32" portion of the term indicates that the variables are 32-bit integers. In the specific example, the term "int32" indicates that the terms "transit," "tmp," "delta", and "jitter" are 32-bit integer variables. Similarly, in line 1712, the term "const int32" indicates that a constant is being defined. The "const" portion of the term indicates a constant is being defined, and the "int32" portion of the term indicates that the constant is a 32-bit integer. In the specific example, the term "const int32" indicates that the term JITTER_THRESHOLD is an 32-bit integer constant having a value that equals seventeen. After the constant and the variables are defined, the variables "transit" and "jitter" are set equal to zero (line 1713), and a start command instructs the timer "jitterTimer" to start counting (line 1714).

The software program of the present embodiment may also utilize familiar programming elements or instructions that are similar to those used in programming languages such as C, C++, and Java. Examples of such programming elements or instructions include "while," "if," "else," etc. Upon reading the present application, one skilled in the art will easily understand how to incorporate and use such programming elements or instructions and other elements or instructions into the software program of the present invention.

In the non-limiting example shown in FIG. 17, the event HighJitter( ) employs a "while" instruction (line 1715) to create a "while loop" (lines 1715-1732) that continues until the success( ) instruction (line 1729) is executed and interrupts the continuous execution of the loop. As described below, the execution of the success( ) instruction, indicates that the jitter in the system exceeds a threshold value.

The while loop includes a match instruction (line 1717) that determines whether or not the variable RTPHeader is detected. The variable RTPHeader is defined elsewhere in the software program and corresponds to the RTP header in a datagram contained in the application layer (i.e. the seventh layer) of the communication model. Furthermore, subfields have been previously defined for the variable RTPHeader, and one of the subfields is the subfield timeStamp. In the present example, the subfield timeStamp is defined to be the subfield within the RTP header that contains the system time indicating when the data contained in the RTP header was transmitted from the source computer.

When the variable RTPHeader is detected by the match instruction, the value of the subfield timeStamp within the variable RTPHeader is determined (i.e. the value RTPHeader.timeStamp is determined). Then, in line 1719, the variable tmp is set equal to the difference between the current value of the timer jitterTimer (i.e. jitterTimer.value) and the value of the subfield timeStamp (i.e. RTPHeader.timeStamp). Accordingly, the variable tmp indicates the difference between the current value of the timer jitterTimer and the time at which the RTP header was transmitted from the source. In other words, the variable tmp indicates the approximate amount of time that was required for the RTP header to travel from the source to the packet processor PP1.

Afterwards, the variable delta is determined by subtracting the variable tmp from the variable transit (line 1720). As noted above, the variable transit initially is set equal to zero (line 1713) before the "while loop" is entered. Furthermore, the variable transit is set equal to the variable tmp within the "while loop" after the variable delta is calculated (line 1721). Thus, the variable delta indicates the approximate difference between the system time and the time at which RTP headers are transmitted from the source.

In certain situations, the variable delta may have a negative value, and an if instruction is used to determine if the variable has a negative value (line 1722). If the variable delta has a negative value, the variable delta is set equal to the complement of itself to ensure that it has a positive value (line 1724).

In any event, a value for the variable jitter is determined based on an equation for calculating jitter (line 1726). Specifically, the value "8" is added to the variable jitter. Also, the term ">>4" is a right shift operator that shifts the value of the term "(jitter+8)" by four bit positions. Thus, term ">>4" is equivalent to dividing the term "(jitter+8)" by eight. Once the term "(jitter+8)>>4" is determined, it is subtracted from the value of the variable delta, and the result is stored as the new value of the variable jitter. After the value of the variable jitter is calculated, an if instruction is executed to determine if the variable jitter exceeds the threshold constant JITTER_THRESHOLD (line 1727). If the variable exceeds the threshold constant, the event HighJitter( ) is deemed to have occurred (i.e. the program determines that a large amount of jitter exists in the system). In such case, the "while loop" is exited and the event HighJitter( ) is completed (line 1729). On the other hand, if the variable is less than the threshold constant, the program determines that an excessive amount of jitter is not contained in the network, and the "while loop" is repeated.

The event IncreaseBandwidth( ) is created based on the event HighJitter( ) and the event QoSHIGH( ). Specifically, in the event IncreaseBandwidth, a match instruction determines if the event HighJitter( ) has occurred (line 1737). If the event HighJitter( ) has occurred, another match instruction is executed to determine if the event QoSHigh( ) has occurred (line 1739). If both events have occurred, then a routine (not shown) to increase the bandwidth is executed. If the software program is being executed by a monitoring system, a routine (not shown) to generate a notification to increase bandwidth is executed when both events have occurred.

Another aspect of the software program of the illustrative, non-limiting embodiment is the capability of informing the system to expect a new, additional process flow that is to be considered part of an existing process flow bundle. To inform the system of the new process flow, the software program utilizes the mergeFlow instruction. Such instruction may be implemented in hardware, software, or combination of hardware and software.

An example of the basic format of the mergeFlow instruction is shown below:

mergeFlow(<flow index number>)

Figure 1:
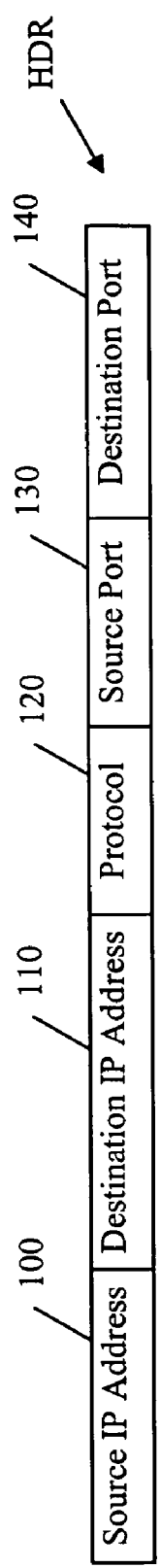
FIG. 1 illustrates a non-limiting example of the format of a header of a data packet.

The flow index number ("FIN") corresponds to reference data that is contained in a particular process flow and uniquely identifies the process flow. As mentioned above, an illustrative example of determining an FIN is described in the '152 application. Also, instead of including an FIN in the parenthetical term above, a variable, which is previously defined and which identifies a particular process flow, may be included. Furthermore, instead of determining the value of an FIN, the parenthetical term above may include other data that uniquely identifies the process flow. For example, the header HDR shown in FIG. 1 uniquely identifies a process flow, and the parenthetical term may include data corresponding to the values in the header HDR. In addition, the difference between uniting and relating process flows for the purpose of merging process flows is explained in the '152 application.

A non-limiting example of a program that employs the mergeFlow instruction is shown in FIG. 18. Such example examines process flows that are generated in accordance with a file transfer protocol ("FTP") transaction. Specifically, in an FTP transaction, a first process flow is generated for commands and other control operations. Furthermore, the first process flow generates a second process flow (i.e. a child process flow) corresponding to the data that subsequently follows the commands or control operations in the first process flow.

In FIG. 18, the program detects the first process flow in the FTP transaction, assigns the subsequent second process flow an FIN, and unites the second process flow with the first process flow. Furthermore, in the present example, the first process flow has previously been assigned an FIN that equals zero.

As shown in the figure, the program concurrently searches for a process flow having an FIN equaling zero (line 1802) and for a process flow having an FIN equaling one (line 1810). In other words, the program concurrently searches for the first and second process flows.

If the packet processor PP1 receives a process flow having an FIN that equals zero, the match instruction in line 1802 is satisfied, and the match instruction in line 1804 is subsequently executed. The match instruction in line 1804 determines if the variable FTPflow exists in the process flow. The variable FTPflow is previously defined to indicate whether or not a process flow is an FTP process flow. If the process flow is an FTP process flow, the match instruction is satisfied, and the mergeFlow instruction in line 1806 is executed.

As described above, when a first FTP process flow is received, a subsequent second process flow is generated that contains data corresponding to the commands, etc. contained in the first process flow. Thus, the mergeFlow instruction assigns the second process flow an FIN equaling one and unites the second process flow with the first process flow.

By enabling the system to prepare for the new second process flow via the mergeFlow instruction, it can accelerate its processing and allocate joint memory resources to the portions of the first and second process flows that are common to the process flows. Such operations utilize system resources more efficiently and enable the system to operate faster. Moreover, the mergeFlow instruction provides the second flow with an FIN that can subsequently be used as a reference to uniquely identify the second process flow.

After the mergeFlow instruction is executed, the software program will treat the first and second process flows as the same process flow and assign the same flow identification number ("flowID") to both process flows. Thus, when an instruction in the software program is directed to a process flow having such flowID, the system will apply the instruction to both the first and second process flows. However, a programmer can create an instruction that applies to only the first process flow or the second process flow by referencing the FIN belonging to the first process flow (i.e. FIN=0) or the FIN belonging to the second process flow (i.e. FIN=1), instead of referencing the general flowID. For example, in FIG. 18, the match instruction in line 1802 is restricted to the flow having an FIN that equals zero, and thus, it is only applied to the first process flow. On the other hand, the match instruction in line 1810 is restricted to the flow having an FIN that equals one, and thus, it is only applied to the second process flow. Furthermore, the match instruction in line 1816 does not restrict the flow to any particular FIN, and thus, it is applied to both the first process flow and the second process flow.

Sometimes, while an event instruction is being executed, the sequence of certain occurrences that are normally expected to occur do not occur. For instance, when a user attempts to logon to a server of a network, the server may send a USER prompt to the personal computer of the user. In such instance, a successful logon response, an unsuccessful logon response, or a password request response is expected to be subsequently transmitted from the server to the personal computer. However, one of the above responses may not actually be transmitted to the personal computer due to an error in the server or an error in the network. In such case, if a processor is executing the program shown in FIG. 7, the processor will continually execute the match instructions at lines 706, 710, and 727 ad infinitum. In other words, the processor will "lock up".

In order to prevent such a situation from occurring, one implementation of the software program contains the throw instruction and the resync instruction. The resync instruction identifies a location in the software program to which the program is supposed to "jump" if the program locks up. Also, the resync instruction contains an exception name or names to distinguish it from any other resync instructions. An example of the basic format of the resync instruction is as follows:

resync on<exception name 1>, <exception name 2>, <etc.>

The throw instruction is provided as an alternative to a certain portion of software code in the event that such portion of code "locks up". The throw instruction contains an exception name, and when the software code locks up and the throw instruction is executed, and the program jumps to the resync instruction containing the same exception name contained in the throw instruction. An example of the basic format of the throw instruction is as follows:

throw<exception name>

An illustrative example of a software program containing the resync and throw instructions is shown in FIG. 19. As shown in the figure, the event A( ) executes a variety of instructions relating to the logon process. For example, in line 1904, the match instruction searches for a user logon request that is transmitted from a personal computer to a server. After such a command is transmitted, the match instruction in line 1906 searches for a password request transmitted from the server to the personal computer. If the password request is never transferred from the server to the personal computer due to some error, the match instruction is not executed, even after a predetermined length of time or after the relevant process flows are terminated. In such case, the otherwise instruction in line 1911 is executed.

The throw instruction in line 1914 is contained in the otherwise instruction and identifies the exception name "anException". Accordingly, when the throw instruction is executed, the program jumps to the resync instruction containing the same exception name. In other words, the program jumps to the resync instruction contained in line 1902. From the resync instruction, the event A( ) executes the match instruction to again determine if a user logon request is transmitted from the personal computer to the server.

In the above example, the throw and resync instructions are contained in the same event A( ). However, the present embodiment is not limited to such an arrangement. For example, a throw instruction contained in an event X( ) may jump to a resync instruction contained in an event Y( ). Also, in the above example, the throw and resync instructions are used in the situation where the program "locks up". However, the use of such instructions is not limited to such a situation. For instance, they can be used in any instance where a program must jump from one portion of the code to another portion of the code.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims and equivalents thereof.

What is claimed is:

1. A method for high level event-based monitoring, classifying, and control of a network system, comprising:

defining an event that occurs in the network system corresponding to at least one of application, presentation, session, transport and network layers of a communication model;

defining a match instruction in an open programming language which is operative to identify packet traffic belonging to a specified peer-to-peer protocol, said match instruction accepting as an argument a protocol message associated with said specifies peer-to-peer protocol;

defining a concurrent operation via a concurrent instruction containing at least two sub-instructions which are concurrently executed until a sub-instruction is completed, such that the concurrent operation includes at least two other operations to be concurrently performed over the network system;

detecting said event;

responsively upon detecting said event, identifying packet traffic belonging to said specified peer-to-peer protocol according to said match instruction; and controlling at least a portion of the network system based on said identifying packet traffic belonging to said specified peer-to-peer protocol, by executing said concurrent operation;

wherein said event is a download flow.

2. An apparatus for high level event-based monitoring, classifying, and control of a network system, comprising:

an interface coupled to the network system; and a processor operative to:

detect a predefined event that occurs in the network system, corresponding to at least one of application, presentation, session, transport, and network layers of a communication model;

identify, responsively upon detecting said event, packet traffic belonging to a specified peer-to-peer protocol by executing a match instruction accepting as an argument a protocol message associated with said specified peer-to-peer protocol;

execute a concurrent instruction containing at least two sub-instructions which are concurrently executed until a sub-instruction is completed; and control at least a portion of the network system when said packet traffic belonging to said specified peer-to-peer protocol is detected, by executing said predetermined concurrent operation which includes at least two other operations to be concurrently performed over the network system;

wherein said event is a download flow.

3. A disk containing a software program with instructions for causing a processor to perform a routine, comprising:

defining an event that occurs in the network system corresponding to at least one of application, presentation, session, transport and network layers of a communication model;

defining a match instruction in an open programming language which is operative to identify packet traffic belonging to a specified peer-to-peer protocol, said match instruction accepting as an argument a protocol message associated with said specified peer-to-peer protocol;

defining a concurrent operation via a concurrent instruction containing at least two sub-instructions which are concurrently executed until a sub-instruction is completed, such that the concurrent operation includes at least two other operations to be concurrently performed over the network system;

detecting said event;

responsively upon detecting said event, identifying packet traffic belonging to said specified peer-to-peer protocol according to said match instruction; and controlling at least a portion of the network system based on said identifying packet traffic belonging to said specified peer-to-peer protocol, by executing said concurrent operation;

wherein said event is a download flow.

4. A memory containing a software program with instructions for causing a processor to perform a routine, comprising:

defining an event that occurs in the network system corresponding to at least one of application, presentation, session, transport and network layers of a communication model;

defining a match instruction in an open programming language which is operative to identify packet traffic belonging to a specified peer-to-peer protocol, said match instruction accepting as an argument a protocol message associated with said specified peer-to-peer protocol;

defining a concurrent operation via a concurrent instruction containing at least two sub-instructions which are concurrently executed until a sub-instruction is completed, such that the concurrent operation includes at least two other operations to be concurrently performed over the network system;

detecting said event;

responsively upon detecting said event, identifying packet traffic belonging to said specified peer-to-peer protocol according to said match instruction; and controlling at least a portion of the network system based on said identifying packet traffic belonging to said specified peer-to-peer protocol, by executing said concurrent operation;

wherein said event is a download flow.

* * * * *